United States Patent
Halevi et al.

(10) Patent No.: US 11,354,539 B2
(45) Date of Patent: Jun. 7, 2022

(54) ENCRYPTED DATA MODEL VERIFICATION

(71) Applicant: International Business Machines Corporation, Armonk, NY (US)

(72) Inventors: Shai Halevi, Elmsford, NY (US); Sharathchandra Pankanti, Darien, CT (US); Karthik Nandakumar, Singapore (SG); Nalini K. Ratha, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 16/143,887

(22) Filed: Sep. 27, 2018

(65) Prior Publication Data

US 2020/0104636 A1   Apr. 2, 2020

(51) Int. Cl.
    G06K 9/62        (2022.01)
    H04L 9/00        (2022.01)
    (Continued)

(52) U.S. Cl.
    CPC ......... *G06K 9/6256* (2013.01); *G06K 9/6228* (2013.01); *G06N 3/04* (2013.01);
    (Continued)

(58) Field of Classification Search
    CPC ...... G06K 9/6256; G06K 9/6228; G06N 3/02; G06N 3/04; G06N 3/0481; G06N 3/08;
    (Continued)

(56) References Cited

U.S. PATENT DOCUMENTS

2017/0221032 A1    8/2017  Mazed
2017/0372201 A1*  12/2017  Gupta .................. G06N 3/0454
(Continued)

OTHER PUBLICATIONS

R. Agrawal and R. Srikant. Privacy-preserving data mining. In W. Chen, J. F. Naughton, and P. A. Bernstein, editors, Proceedings of the 2000 ACM SIGMOD International Conference on Management of Data, May 16-18, 2000, Dallas, Texas, USA., pp. 439-450. ACM, 2000.

(Continued)

*Primary Examiner* — Shane D Woolwine
(74) *Attorney, Agent, or Firm* — Harrington & Smith

(57) ABSTRACT

An AI model is trained by determining insights for a sequence of computations used in the AI model. The sequence is applied to encrypted data and label pair(s), wherein computational details of each of the computations are defined. Information may also be committed for selected ones of the sequence of computations into a distributed database. The committed information may include computational details used in processing performed for the selected computations, and the distributed database may have a property that the committed information for each selected computation is linked with a verifiable signature of integrity with a previously committed computation in the sequence. Indication is received from an end-user computer system of selected computation(s). Computational details of the indicated selected computation(s) are sent toward the end-user computer system for use by the end-user computer system for verifying the indicated selected computation(s). The end-user computer system can verify the selected computation(s).

22 Claims, 9 Drawing Sheets

(51) Int. Cl.
| | |
|---|---|
| *G06N 3/04* | (2006.01) |
| *G06N 3/08* | (2006.01) |
| *G06N 20/00* | (2019.01) |
| *G06V 10/44* | (2022.01) |
| *G06V 10/82* | (2022.01) |
| *H04L 9/32* | (2006.01) |

(52) U.S. Cl.
CPC .............. *G06N 3/08* (2013.01); *G06N 3/084* (2013.01); *G06N 20/00* (2019.01); *G06V 10/454* (2022.01); *G06V 10/82* (2022.01); *H04L 9/008* (2013.01); *H04L 9/3239* (2013.01); *H04L 9/3247* (2013.01); *G06N 3/0481* (2013.01); *H04L 2209/38* (2013.01)

(58) Field of Classification Search
CPC ........ G06N 3/084; G06N 20/00; G06N 20/10; G06N 20/20; G06V 10/454; G06V 10/82; H04L 9/008; H04L 9/3239; H04L 9/3247; H04L 2209/38
See application file for complete search history.

(56) References Cited

U.S. PATENT DOCUMENTS

| | | |
|---|---|---|
| 2018/0018590 A1 | 1/2018 | Szeto et al. |
| 2018/0096175 A1 | 4/2018 | Schmeling et al. |
| 2020/0036510 A1* | 1/2020 | Gomez ................. H04L 9/0825 |

OTHER PUBLICATIONS

M. Barni, C. Orlandi, and A. Piva. A privacy-preserving protocol for neural-network-based computation. In Proceedings of the 8th Workshop on Multimedia and Security, MM&Sec '06, pp. 146-151, New York, NY, USA, 2006. ACM.

D. Boneh, C. Gentry, S. Halevi, F. Wang, and D. J. Wu. Private database queries using somewhat homomorphic encryption. In ACNS, vol. 7954 of Lecture Notes in Computer Science, pp. 102-118. Springer, 2013.

Z. Brakerski. Fully homomorphic encryption without modulus switching from classical gapsvp. In R. Safavi-Naini and R. Canetti, editors, CRYPTO, vol. 7417 of Lecture Notes in Computer Science, pp. 868-886. Springer, 2012.

Z. Brakerski, C. Gentry, and V. Vaikuntanathan. (leveled) fully homomorphic encryption without boot-strapping. ACM Transactions on Computation Theory, 6(3):13, 2014.

A. Costache, N. P. Smart, S. Vivek, and A. Waller. Fixed-point arithmetic in SHE schemes. In SAC, vol. 10532 of Lecture Notes in Computer Science, pp. 401-422. Springer, 2016.

J. L. H. Crawford, C. Gentry, S. Halevi, D. Platt, and V. Shoup. Doing real work with FHE: the case of logistic regression. IACR Cryptology ePrint Archive, 2018:202, 2018.

C. Gentry. Fully homomorphic encryption using ideal lattices. In Proceedings of the 41st ACM Symposium on Theory of Computing—STOC 2009, pp. 169-178. ACM, 2009.

C. Gentry, S. Halevi, C. S. Jutla, and M. Raykova. Private database access with he-over-oram architecture. In ACNS, vol. 9092 of Lecture Notes in Computer Science, pp. 172-191. Springer, 2015.

C. Gentry, A. Sahai, and B. Waters. Homomorphic encryption from learning with errors: Conceptually-simpler, asymptotically-faster, attribute-based. In R. Canetti and J. A. Garay, editors, Advances in Cryptology—CRYPTO 2013, Part I, pp. 75-92. Springer, 2013.

R. Gilad-Bachrach, N. Dowlin, K. Laine, K. E. Lauter, M. Naehrig, and J. Wernsing. Cryptonets: Applying neural networks to encrypted data with high throughput and accuracy. In ICML, vol. 48 of JMLR Workshop and Conference Proceedings, pp. 201-210. JMLR.org, 2016.

Z. G. T. Gu and S. Garg. Safetynets: Verifiable execution of deep neural networks on an untrusted cloud. In Advances in Neural Information Processing Systems, NIPS '17, 2017.

S. Halevi and V. Shoup. HElib—An Implementation of homomorphic encryption. https://github. com/shaih/HElib/, Accessed Sep. 2014.

A. Khedr, P. G. Gulak, and V. Vaikuntanathan. SHIELD: scalable homomorphic implementation of encrypted data-classifiers. IEEE Trans. Computers, 65(9):2848-2858, 2016.

A. Kim, Y. Song, M. Kim, K. Lee, and J. H. Cheon. Logistic regression model training based on the approximate homomorphic encryption. Cryptology ePrint Archive, Report 2018/254, 2018. https: //eprint.iacr.org/2018/254.

M. Kim, Y. Song, S. Wang, Y. Xia, and X. Jiang. Secure logistic regression based on homomorphic encryption: Design and evaluation. JMIR Med Inform, 6(2):e19, Apr. 2018. available fromhttps://ia.cr/2018/074.

Y. LeCun, L. Bottou, Y. Bengio, and P. Haffner. Gradient-based learning applied to document recognition. Proceedings of the IEEE, 86(11):2278-2324, 1998.

Y. Lindell and B. Pinkas. Privacy preserving data mining. J. Cryptology, 15(3):177-206, 2002.

J. Liu, M. Juuti, Y. Lu, and N. Asokan. Oblivious neural network predictions via minionn transformations. In B. M. Thuraisingham, D. Evans, T. Malkin, and D. Xu, editors, Proceedings of the 2017 ACM SIGSAC Conference on Computer and Communications Security, CCS 2017, Dallas, TX, USA, Oct. 30-Nov. 3, 2017, pp. 619-631. ACM, 2017.

P. Mohassel and Y. Zhang. Secureml: A system for scalable privacy-preserving machine learning. In 2017 IEEE Symposium on Security and Privacy, SP 2017, San Jose, CA, USA, May 22-26, 2017, pp. 19-38. IEEE Computer Society, 2017.

V. Nikolaenko, U. Weinsberg, S. Ioannidis, M. Joye, D. Boneh, and N. Taft. Privacy-preserving ridge regression on hundreds of millions of records. In Security and Privacy (SP), 2013 IEEE Symposium on, pp. 334-348. IEEE, 2013.

C. Orlandi, A. Piva, and M. Barni. Oblivious neural network computing via homomorphic encryption. EURASIP J. Information Security, 2007, 2007.

M. S. Riazi, C. Weinert, O. Tkachenko, E. M. Songhori, T. Schneider, and F. Koushanfar. Chameleon: A hybrid secure computation framework for machine learning applications. In 13 ACM Asia Conference on Information, Computer and Communications Security (ASIACCS'18). ACM, Jun. 4-8, 2018. To appear. Preliminary version: http://ia.cr/2017/1164.

C. J. V. Vaikuntanathan and A. Chandrakasan. GAZELLE: a low latency framework for secure neural network inference. In arXiv preprint, 2018.

S. Wang, Y. Zhang, W. Dai, K. Lauter, M. Kim, Y. Tang, H. Xiong, and X. Jiang. Healer: homomorphic computation of exact logistic regression for secure rare disease variants analysis in gwas. Bioinformatics, 32(2):211-218, 2016.

Hitaj, Briland, Giuseppe Ateniese, and Fernando Pérez-Cruz. "Deep models under the GAN: information leakage from collaborative deep learning." Proceedings of the 2017 ACM SIGSAC Conference on Computer and Communications Security. ACM, 2017.

Liu, Jian, et al. "Oblivious neural network predictions via minion transformations." Proceedings of the 2017 ACM SIGSAC Conference on Computer and Communications Security. ACM, 2017.

Kim, Miran, et al. "Secure Logistic Regression Based on Homomorphic Encryption: Design and Evaluation." JMIR medical informatics 6.2 (2018): e19.

Makri, Eleftheria, et al. PICS: Private Image Classification with SVM. IACR Cryptology ePrint Archive 2017/1190, 2017.

Hardy, Stephen, et al. "Private federated learning on vertically partitioned data via entity resolution and additively homomorphic encryption." arXiv preprint arXiv:1711.10677 (2017).

Ghodsi, Zahra, Tianyu Gu, and Siddharth Garg. "SafetyNets: Verifiable Execution of Deep Neural Networks on an Untrusted Cloud." Advances in Neural Information Processing Systems. 2017.

Riazi, M. Sadegh, et al. "Chameleon: A Hybrid Secure Computation Framework for Machine Learning Applications." arXiv preprint arXiv: 1801.03239 (2018).

Ran Gilad-Bachrach, Nathan Dowlin, Kim Laine, Kristin Lauter, Michael Naehrig, and John Wernsing. 2016. CryptoNets:

(56) References Cited

OTHER PUBLICATIONS

ApplyingNeural Networks to Encrypted Data with high Throughput and Accuracy.In International Conference on Machine Learning. 201-210.

Chiraag Juvekar, Vinod Vaikuntanathan, and Anantha Chandrakasan. 2018. GAZELLE: A Low Latency Framework for Secure Neural Network Inference. arXiv preprint arXiv:1801.05507 (2018).

M. Zinkevich, M. Weimer, L. Li, and A. J. Smola. Parallelized stochastic gradient descent. 2010 [retrieved Jun. 12, 2018].

* cited by examiner

```
nn.Sequential{
  [input -> (1) -> (2) -> (3) -> (4) -> (5) -> (6) -> (7) -> output]
  (1): nn.Reshape(64)
  (2): nn.Linear(64->32)
  (3): nn.Sigmoid
  (4): nn.Linear(32->16)
  (5): nn.Sigmoid
  (6): nn.Linear(16->10)
  (7): nn.Sigmoid
}
```

ENCRYPTED DATA MODEL VERIFICATION

BACKGROUND

This invention relates generally to artificial intelligence models and encryption and, more specifically, relates to encrypted data model verification when using artificial intelligence models that perform homomorphic encryption operations.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, at the beginning of the detailed description section.

Advances in machine learning and its efficacy are increasingly being adopted by a wide variety of industries and applications. There are emerging businesses organized around providing services for the following:

1) Training: Insights are learned from domain-specific "training" data samples from the end-users, which allows development and learning of models capable of predicting insights from new data; and 2) Inference: Given learnt models and new data, predictions are made on the new data.

Given the privacy and regulatory constraints on user data, learning "encrypted models" (i.e., models learned from encrypted data) and using such models to make encrypted predictions (i.e., the predicted labels are output in an encrypted form) can be of value.

It is unclear, however, how the stakeholders can verify provenance of the models and/or the training that has been performed.

SUMMARY

This section is meant to be exemplary and not meant to be limiting.

A method is disclosed in an exemplary embodiment. The method includes training, by a computer system, an artificial intelligence model at least by determining insights for a sequence of computations used in the artificial intelligence model, the sequence being applied to one or more encrypted data and label pairs. Computational details of each of the computations are defined. The method includes receiving, at the computer system, indication from an end-user computer system of one or more of the selected computations. The method further includes sending computational details of the indicated one or more selected computations toward the end-user computer system for use by the end-user computer system for verifying the indicated one or more selected computations.

In another exemplary embodiment, a computer system is disclosed. The computer system comprises memory having computer program code and one or more processors. The one or more processors, in response to retrieval and execution of the computer program code, cause the computer system to perform operations comprising: training, by the computer system, an artificial intelligence model at least by determining insights for a sequence of computations used in the artificial intelligence model, the sequence being applied to one or more encrypted data and label pairs, wherein computational details of each of the computations are defined; receiving, at the computer system, indication from an end-user computer system of one or more of the selected computations; and sending computational details of the indicated one or more selected computations toward the end-user computer system for use by the end-user computer system for verifying the indicated one or more selected computations.

A further exemplary embodiment is a computer program product comprising a computer readable storage medium having program instructions embodied therewith. The program instructions are executable by a computer system to cause the computer system to perform operations comprising: training, by the computer system, an artificial intelligence model at least by determining insights for a sequence of computations used in the artificial intelligence model, the sequence being applied to one or more encrypted data and label pairs, wherein computational details of each of the computations are defined; receiving, at the computer system, indication from an end-user computer system of one or more of the selected computations; and sending computational details of the indicated one or more selected computations toward the end-user computer system for use by the end-user computer system for verifying the indicated one or more selected computations.

Another exemplary embodiment is a method. The method comprises homomorphically encrypting, by a first computer system, one or more data and label pairs as training data and sending by the first computer system the training data toward a second computer system, for use by the second computer system for training an artificial intelligence model having a sequence of computations; choosing by the first computer system one or more computations from selected ones of the sequence of computations; sending by the first computer system indication of the one or more chosen computations toward the second computer system; receiving, by the first computer system and from the second computer system, computational details of the indicated one or more chosen computations; and verifying by the first computer system the indicated one or more chosen computations using at least the computational details and the artificial intelligence model, wherein in response to the one or more chosen computations being verified, the corresponding artificial intelligence model is considered to be verified.

Another exemplary embodiment is a computer system. The computer system comprises memory having computer program code and one or more processors. The one or more processors, in response to retrieval and execution of the computer program code, cause the computer system to perform operations comprising: homomorphically encrypting, by the computer system as a first computer system, one or more data and label pairs as training data; sending by the first computer system the training data toward a second computer system, for use by the second computer system for training an artificial intelligence model having a sequence of computations; choosing by the first computer system one or more computations from selected ones of the sequence of computations; sending by the first computer system indication of the one or more chosen computations toward the second computer system; receiving, by the first computer system and from the second computer system, computational details of the indicated one or more chosen computations; and verifying by the first computer system the indicated one or more chosen computations using at least the computational details and the artificial intelligence model, wherein in response to the one or more chosen computations being verified, the corresponding artificial intelligence model is considered to be verified.

A further exemplary embodiment is a computer program product comprising a computer readable storage medium having program instructions embodied therewith. The program instructions are executable by a computer system to cause the computer system to perform operations comprising: homomorphically encrypting, by the computer system as a first computer system, one or more data and label pairs as training data; sending by the first computer system the training data toward a second computer system, for use by the second computer system for training an artificial intelligence model having a sequence of computations; choosing by the first computer system one or more computations from selected ones of the sequence of computations; sending by the first computer system indication of the one or more chosen computations toward the second computer system; receiving, by the first computer system and from the second computer system, computational details of the indicated one or more chosen computations; and verifying by the first computer system the indicated one or more chosen computations using at least the computational details and the artificial intelligence model, wherein in response to the one or more chosen computations being verified, the corresponding artificial intelligence model is considered to be verified.

A further exemplary embodiment is a method. The method comprises homomorphically encrypting, by a first computer system, one or more data and label pairs as training data and sending by the first computer system the training data toward a second computer system, for use by the second computer system for training an artificial intelligence model having a sequence of computations and for committing information for selected ones of the sequence of computations into a distributed database. The method also comprises choosing by the first computer system one or more computations from selected ones of the sequence of computations that have been committed to the distributed database. The method include sending by the first computer system indication of the one or more chosen computations toward a distributed database and receiving, by the first computer system and from the distributed database, computational details of the indicated one or more chosen computations. The method further includes verifying by the first computer system the indicated one or more chosen computations using at least the computational details and the artificial intelligence model, wherein in response to the one or more chosen computations being verified, the corresponding artificial intelligence model is considered to be verified.

In another exemplary embodiment, a computer system is disclosed. The computer system comprises memory having computer program code and one or more processors. The one or more processors, in response to retrieval and execution of the computer program code, cause the computer system to perform operations comprising: homomorphically encrypting, by the computer system as a first computer system, one or more data and label pairs as training data; sending by the first computer system the training data toward a second computer system, for use by the second computer system for training an artificial intelligence model having a sequence of computations and for committing information for selected ones of the sequence of computations into a distributed database; choosing by the first computer system one or more computations from selected ones of the sequence of computations that have been committed to the distributed database; sending by the first computer system indication of the one or more chosen computations toward a distributed database; receiving, by the first computer system and from the distributed database, computational details of the indicated one or more chosen computations; and verifying by the first computer system the indicated one or more chosen computations using at least the computational details and the artificial intelligence model, wherein in response to the one or more chosen computations being verified, the corresponding artificial intelligence model is considered to be verified.

A further exemplary embodiment is a computer program product comprising a computer readable storage medium having program instructions embodied therewith. The program instructions are executable by a computer system to cause the computer system to perform operations comprising: homomorphically encrypting, by the computer system as a first computer system, one or more data and label pairs as training data; sending by the first computer system the training data toward a second computer system, for use by the second computer system for training an artificial intelligence model having a sequence of computations and for committing information for selected ones of the sequence of computations into a distributed database; choosing by the first computer system one or more computations from selected ones of the sequence of computations that have been committed to the distributed database; sending by the first computer system indication of the one or more chosen computations toward a distributed database; receiving, by the first computer system and from the distributed database, computational details of the indicated one or more chosen computations; and verifying by the first computer system the indicated one or more chosen computations using at least the computational details and the artificial intelligence model, wherein in response to the one or more chosen computations being verified, the corresponding artificial intelligence model is considered to be verified.

DETAILED DESCRIPTION

Figure 1:
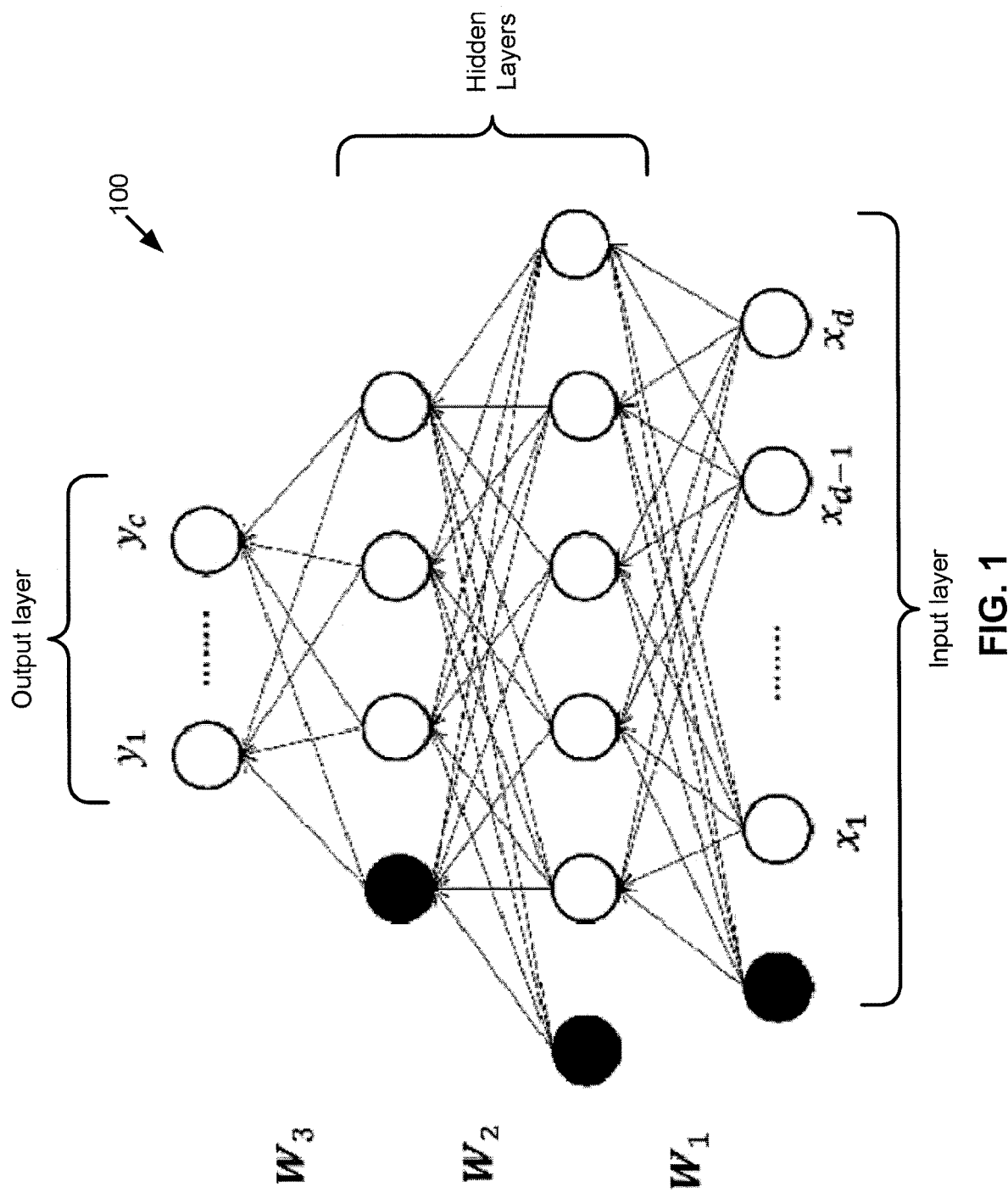
FIG. 1 illustrates an exemplary neural network with two hidden layers.

The following abbreviations that may be found in the specification and/or the drawing figures are defined as follows:
AI artificial intelligence
DNN deep neural network
FHE fully homomorphic encryption
GD gradient descent
I/F interface
LSP learning service provider
MNIST modified national institute of standards and technology
NIT network for inferencing and training
NN neural network
N/W network
Rx receiver
SGD stochastic gradient descent
Tx transmitter The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The instant examples provided herein concern techniques for encrypted data model verification. These techniques may be used to address concerns such as how to make sure that the (correct) user data was used and how to prevent or reduce the chance that the provider just provides an old network, instead of a current one.

The instant examples use an underlying system referred to herein as the Fully Homomorphic Encryption based Network for Inferencing and Training (FHE-NIT). The first part of this document (the Prologue and Sections 1 to 4) describes the FHE-NIT system and its technological bases. The second part of this document (Section 5) describes in more detail exemplary embodiments that use the FHE-NIT system.

Prologue. Background to and overview of the FHE-NIT system

Deep learning is an extremely valuable tool in solving tough problems in many core technology areas including text, speech, language, dialogue and vision. The three critical factors that typically determine the success of deep learning models are: (i) availability of sufficient training data, (ii) access to extensive computational resources, and (iii) expertise in selecting the right model and hyperparameters (parameters whose values are set before the learning process begins) for the selected task.

In many cases, the availability of data is the hard part, since data that could have been used in training cannot be shared due to compliance, legal, and privacy reasons. Cryptographic techniques such as fully homomorphic encryption (FHE) offer a potential solution to the above conundrum. FHE allows processing of encrypted data, making the data and computations "invisible" even as they are used. While some prior work was done on using homomorphic encryption for inferencing, training a deep neural network in the encrypted domain is an extremely challenging task due to the computational complexity of the operations involved.

In this part, we demonstrate for the first time the plausibility of training on encrypted data. An exemplary proposed system, which we call Fully Homomorphic Encryption based Network for Inferencing and Training (FHE-NIT), may use the open-source FHE toolkit HElib to implement a Stochastic Gradient Descent (SGD)-based training of a neural network, and allows inferencing by querying the encrypted model. To enable encrypted training, the network has to undergo significant changes to minimize the degradation in the underlying accuracy. We also study the impact of data representation and resolution on the FHE-NIT. Finally, we explore the efficient distribution of operations over multiple computing nodes to speed up the training process.

A key advantage of FHE-NIT is that it is completely non-interactive, which prevents leakage of any sensitive information during training or inferencing. We demonstrate the feasibility of our end-to-end solution in the context of MNIST dataset and suggest ways to reduce training time and enhance accuracy. While the cost of training a complex deep learning model from scratch may be very high, we demonstrate that at least in some settings, it is not astronomical. Moreover, the proposed approach could be used for tasks such as transfer learning as well as fine-tuning of deep learning models.

1. INTRODUCTION

Deep neural networks (DNNs) are powerful tools with a wide range of applications, from speech to vision and much more. Solutions that use deep neural networks consist of two main phases, namely training and inference: After appropriate datasets are identified and curated, a network architecture is established, and then the identified corpus of data is used to train it, i.e., to learn the weights for the network. Once the network weights are stable and provide meaningful results for the application at hand, the network can be used for inferencing, where the network renders predictions on new data. While the training time may run into days, inferencing is expected to be fast.

There are many scenarios where the data needed for training is sensitive, such as when it belongs to some organization but cannot be shared outside. For example, credit card transaction information is available with the credit card company but not for an ordinary user. Similarly healthcare data related to patients is available in a hospital but not for a researcher to find patterns in the data for understanding cancer progression. Moreover, privacy concerns (such as the new European data privacy regulation GDPR) may restrict the availability of data. Similar situations arise where competitors would like to pull their data to build accurate models (such as different banks having data relating to the transactions and wanting to build fraud detection models). Restricting the availability of data may prevent otherwise useful models from being used, or degrade their performance.

Cryptographic techniques for computing on encrypted data offer an appealing approach for resolving the tension between usefulness and sensitivity of data. However, the current common wisdom is that such techniques are too slow to handle the training of common models. In this work, we propose using Fully Homomorphic Encryption (FHE) to address this tension. The original proposal of fully-homomorphic encryption (FHE) was touted as a revolutionary technology [8], with potential far-reaching implications to cloud computing and beyond. Though only a theoretical plausibility result at first, the last decade saw major algorithmic improvements (e.g., [4, 5, 10]), resulting in many research prototypes that implement this technology and attempt to use it in different settings (e.g., [3, 9, 14, 6, 11, 16], among others).

Training the model on encrypted data would enable users to provide their data to the service provider in encrypted form, and the provider can train the model without ever seeing the underlying data. The resulting model will also be encrypted, and so using it would require access to the secret key. That is, because the underlying data is encrypted, then the model itself is encrypted, because the weights are all encrypted and the actual values of these cannot be determined without decrypting them. Anyone who wanted to employ the actual model itself would require access to the secret key, to which only a specific client has access. This makes it possible to implement flexible systems, where control of both data and model is handled via key-management, making it possible to adjust it to business and regulatory considerations.

Perhaps surprisingly, we provide evidence that in some settings, the FHE-NIT system may be fast enough to support even the demanding training phase of deep networks, in certain situations. To the best of our knowledge, this is the first disclosure to demonstrate that fully homomorphic encryption can be used not just for inferencing but also for training. The design approach presented in this paper demonstrates the feasibility of FHE to protect privacy and data security while learning a model and corresponding network.

1.1 Related Work

While privacy-preserving machine learning has been studied for nearly twenty years [18, 1], not much work was done on specifically using homomorphic implementation for neural networks. The only prior work that we found using non-interactive homomorphic encryption for neural networks is the Crypto-Nets work of Gilad-Bachrach et al. [11]. That work demonstrated a carefully-designed neural network that that can run the inference phase on encrypted data, with 99% accuracy on the MNIST optical character recognition tasks, achieving amortized rate of almost 60,000 predictions/hour.

There has been more work about using homomorphic encryption in conjunction with interactive secure-computation protocols in the context of neural networks. An early work along these lines is due to Barth et al. and Orlandi et al. [2, 22], that combined additively-homomorphic encryption with an interactive protocol, and were able to run the inference part of a small network in about ten seconds. Many more interactive protocols for the inference phase were suggested recently, including SecureML of Mohassel and Zhang [20], MiniONN of Liu et al. [19], Chameleon of Riazi et al. [23], and GAZFELE of Juvekar et al. [24]. The last of these can perform the inference phase of MNIST as fast as 30 ms, and the CIFAR-10 benchmark in just 13 seconds.

All these works address only the inference phase of using the network, none of them addresses the training phase. In fact we were not able to find any prior work that deals with private training of neural networks. Presumably, this is due to the perception that trying to train homomorphically will be so slow as to render it unusable. In the current work we take the first step toward dispelling this perception, showing that even non-interactive homomorphic encryption can be used for training, in some cases.

Some prior work described how to preform training and inference for other types of models on encrypted data, specifically linear-regression models [21] and even logistic-regression models [25, 12, 16, 15, 7].

2. PROPOSED EXEMPLARY SOLUTIONS FOR THE FHE-NIT SYSTEM

In this section, we describe the deep learning model and the components of the solution needed to achieve full homomorphic encryption for learning and inference used for the FHE-NIT system.

2.1 Deep Learning Model

In this part, we primarily focus on supervised deep learning, where the broad objective is to learn a non-linear mapping between the inputs (training samples) and the outputs (e.g., class labels of the training samples). Deep learning models are typically implemented as multi-layer neural networks, which allows higher-level abstract features to be computed as non-linear functions of lower-level features (starting with the raw data). FIG. 1 shows an exemplary neural network (NN) 100 with two hidden layers. The NN 100 is a deep neural network (DNN), which is typically defined as a NN with multiple hidden layers. Here, the black circles denote bias nodes that always emit a value of 1 (one). There is an input layer with inputs of $x_1, \ldots, x_{d-1}, x_d$ and an output layer of $y_1 \ldots y_c$. Weight matrices $W_l$ (see $W_1, W_2,$ and $W_3$) determine the contribution of each input signal to the activation function at a node. The output of each node (also a node is also known as a neuron) in the network is computed by applying a non-linear activation function to the weighted average of its inputs, which includes a bias term that always emits value 1. The output vector of neurons in layer $l$ ($l=1, 2, \ldots, L$) is obtained as:

$$a_l = f(W_l a_{l-1}), \tag{1}$$

where $f$ is the activation function, $W_l$ is the weight matrix of layer $l$, and $L$ is the total number of layers in the network.

Given the training data $\{x_i, y_i\}_{i=1}^N$, the goal is to learn the parameters (e.g., weight matrices) in order to minimize a pre-defined loss function $\mathcal{L}$. This is a non-linear optimization problem, which is typically solved using variants of gradient descent. Gradient descent starts with a random set of parameters, computes the gradient of the loss function $\mathcal{L}$ at each step, and updates the parameters so as to decrease the gradient. In this work, we use the well-known stochastic gradient descent (SGD) algorithm [26], where the gradients are averaged over a small (randomly sampled without replacement) subset (mini-batch) of the whole training dataset. One full iteration over the entire training set is referred to as the epoch. The above gradient update step is repeated until convergence to a local optimum or until the maximum number of epochs is reached. The update rule for SGD for weight matrix $W_l$ is the following:

$$W_\ell := W_\ell - \alpha \frac{\partial \mathcal{L}_B}{\partial W_\ell}, \tag{2}$$

where $\mathcal{L}_B$ is the loss function computed over the mini-batch B and $\alpha$ is the learning rate. The error or loss value at the output layer is computed based on the forward pass, while backpropagation is used to propagate this error back through the network.

2.2 Homomorphic Implementation of Deep Learning

We use the open-source fully homomorphic encryption library called HElib [13] as our primary toolkit to implement the model learning procedure. Devising a homomorphic computation of this procedure brings up many challenges. Here we briefly discuss some of them.

2.2.1 Implementing the Basic Homomorphic Operation

Most of the operations in model learning are linear, involving additions and multiplications. The current version of HElib that we use supports addition and multiplication operations of arbitrary numbers in binary representation, using encryption of the individual bits. This means that we use the underlying homomorphic encryption scheme with native plaintext space modulo 2, which we use to encrypt the bits of the input.

Two key steps in the algorithm require computing "complex" functions (such as exponentiation, etc.). These two steps are (i) computation of the activation function $f$ and its derivative, and (ii) computation of the loss function $\mathcal{L}$ and its derivative. The "natural" approaches for computing these functions homomorphically, are either to approximate them by low-degree polynomials (e.g., using their Taylor expansion), or by pre-computing them in a table and performing homomorphic table lookup. Namely, for a function $f$ that we need to compute, we pre-compute (in the clear) a table $T_f$ such that $T_f[x]=f(x)$ for every x in some range. Subsequently, given the encryptions of the (bits of) x, we perform homomorphic table lookup to get the (bits of) value $T_f[x]$. Following Crawford et al. [7], we adopt the second approach here. This is faster and shallower when it is applicable, but it can only be used to get a low-precision approximation of these functions. In order to avoid the use of too many table lookups, we will use sigmoid activation function and quadratic loss function, which have simpler derivatives.

2.2.2 Parameters and Bootstrapping

We adopted the parameter setting used in [7], which means that the "production version" of our solution uses the cyclotomic ring $\mathbb{Z}[X]/(\Phi_m(X))$, with $m=2^{15}-1$, corresponding to lattices of dimension $\phi(m)=27000$. This native plaintext space yields 1800 plaintext slots, each holding a bit. (Each slot can actually hold an element of $GF(2^{15})$, but we only use the slots to hold bits in our implementation). The other parameters are chosen so as to get security level of about 80 bits, and this parameter setting allows bootstrapping, so we can evaluate the deep circuits that are required for training.

Most of our development and testing was done on a toy setting of parameters, with $m=2^{10}-1$ (corresponding to lattices of dimension $\phi(m)=600$). For that setting we have only 60 plaintext slots per ciphertext (each capable of holding an element of $GF(2^{10})$, but only used to hold a single bit).

2.3 Data Representation and Encoding

All the operations in the proposed solution are applied to integers in binary representation (i.e., using encryption of the individual bits).

2.3.1 Input & Output:

We use 8-bit signed integer representation for the inputs to the network. The outputs of the network are the weight matrices and each element in the weight matrix is represented as a 16-bit signed integer. To deal with negative integers, we use the 2s-complement representation wherever necessary.

2.3.2 Ciphertext Packing:

We set the mini-batch size during training to be the same as the number of slots in the plaintext space. Note that for our final implementation, $m=2^{15}-1$ and the number of slots is 1800. The ciphertexts are represented as 2-dimensional arrays, i.e., encryptedInput[i][0] contains the encryption of the least significant bits of all the 1800 numbers in the i-th dimension of the input. Similarly, encryptedInput[i][7] contains the encryptions of the most significant bits.

2.3.3 Matrix Multiplication:

One of the critical and time-consuming operations in the encrypted domain, especially in the context of mini-batch SGD, is matrix multiplication. Since computation of dot products is not straightforward due to the way in which the inputs are packed in a ciphertext, we adopt the following simple approach for matrix multiplication in the encrypted domain. Suppose $A=[a_{ij}]$ and $B=[b_{jk}]$ are two matrices, where $i=1, \ldots, d_i$, $j=1, \ldots, d_j$ and $k=1, \ldots, d_k$. Let $C=[c_{ik}]$ be the product of A and B. Then, $$c_i = \sum_{j=1}^{d_j} \alpha_{ij} b_j, \qquad (3)$$

where $c_i$ is a ciphertext packing all the elements in the $i^{th}$ row of C, $\alpha_{ij}$ is a ciphertext containing the encryption of value $a_{ij}$ in all the slots, and $b_j$ is a ciphertext packing all the elements in the $j^{th}$ row of B. Thus, each matrix multiplication involves $d_i \times d_j$ ciphertext multiplications.

3. RESULTS

In this section, we describe the dataset used in our experiment as well as the results in terms of accuracy and timing.

3.1 Dataset and Neural Network Parameter Selection

Figures 2, 2A, 2B, 3:
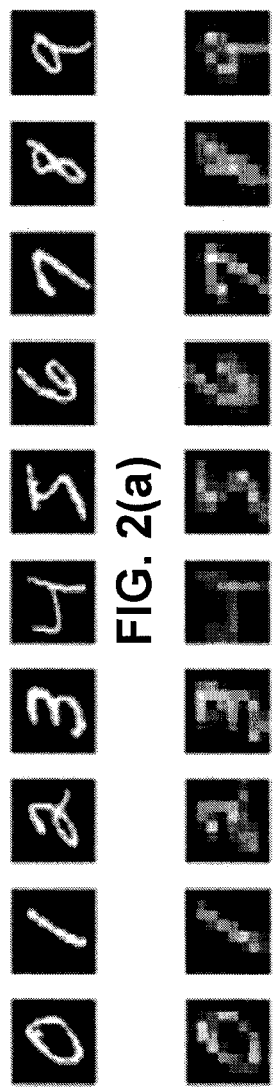
FIG. 2 illustrates samples from the MNIST training dataset as follows.
FIG. 2(a) illustrates a (28×28) pixel representation before any preprocessing.
FIG. 2(b) illustrates an (8×8) pixel representation after cropping and rescaling.
FIG. 3 illustrates a 3-layer fully connected network with a sigmoid activation function.

We conduct experiments on the standard MNIST benchmark dataset [17] for handwritten digit recognition consisting of 60,000 training examples and 10,000 test examples. Each example is a 28×28 gray-level image, with digits located at the center of the image. See FIG. 2, which illustrates samples from the MNIST training dataset as follows: FIG. 2(*a*) illustrates (28×28) pixel representation before any preprocessing; and FIG. 2(*b*) illustrates (8×8) pixel representation after cropping and rescaling (displayed with a similar size as the top row for comparison). The architecture of the neural network used in this part of the disclosure is shown in FIG. 3, which is a 3-layer fully connected network with sigmoid activation function. More specifically, FIG. 3 illustrates a neural network architecture (NN2) used for MNIST dataset with 64 inputs. FIG. 3 is a representation (e.g., in pseudo-code) of a 4-layer DNN, with (1) as the input layer, (2)+(3) as a first hidden layer, (4)+(5) as a second hidden layer, and (6)+(7) as the output layer. There are 64 input nodes in the input layer and 10 output nodes in the output layer.

Cropping of boundary pixels and rescaling using bicubic interpolation are used to reduce the original MNIST images to (8×8) pixels. The cropping and rescaling operations are performed in the plaintext domain and the 64 inputs are then encrypted using the FHE scheme. We normalize all the samples (both training and test) by subtracting the average and dividing by the standard deviation of training samples. This normalized image is finally vectorized to obtain a $d_0$-dimensional representation, which forms the input to the neural network, i.e., $x_i \in \mathcal{R}^{d_0}$.

Since the objective is to classify the input as one of 10 possible digits within ["0"-"9"], we set the size of the output layer as 10. The desired output is represented as a 10-dimensional vector $y_i=[y_{i,0}, \ldots, y_{i,9}]$, with value $y_{i,j}=1$ if the sample belongs to $j^{th}$ class and 0 otherwise. We use a quadratic loss function at the output during training, i.e., $\mathcal{L} = (\|a_L - y_i\|^2)/2$. During inferencing, the input sample is assigned to the class whose corresponding neuron has the highest activation.

We consider two different sets of parameters for the above 3-layer neural network. Firstly, we present the full 784-dimensional (28×28) input to the neural network (denoted as NN1), which contained 128 and 32 neurons in the two hidden layers. Consequently, the number of parameters to be learned is 104,938 (=(128×785)+(32×129)+(10×33)). Since learning such a large number of parameters is currently beyond the reach of most FHE schemes, we also consider a much smaller network (denoted as NN2) with $d_0 = 64$, and containing 32 and 16 neurons in the two hidden layers (see FIG. 2). This is achieved by cropping only the central 24×24 pixels of each image and rescaling the image by a factor of (⅓) using bicubic interpolation to obtain a 8×8 pixel representation. FIG. 2 shows some examples of the raw and processed MNIST images. For the latter network, the number of parameters to be learned is only 2,778, computed by the following: (=(32×65)+(16×33)+(10×17)).

The weights of the network are randomly initialized by sampling from a Gaussian distribution with zero mean and a standard deviation of 0.1. Though quadratic loss function and sigmoid activation function may not be optimal choices for the selected application, we nevertheless employ them to avoid the need for complex table lookups during backpropagation. Note that the sigmoid activation function is given by $f(z) = (1 + \exp(-z))^{-1}$ and its derivative can be easily computed as $f'(z) = f(z)(1 - f(z))$, without the need for any rational divisions. Similarly, the derivative of the quadratic loss function is simply $(a_L - y_i)$. Thus, the entire training process requires the computation of only one complex function, namely, the sigmoid function, which is implemented as an 8-bit table lookup as described in Section 2.2.

3.2 Classification Accuracy

Figures 4, 5:
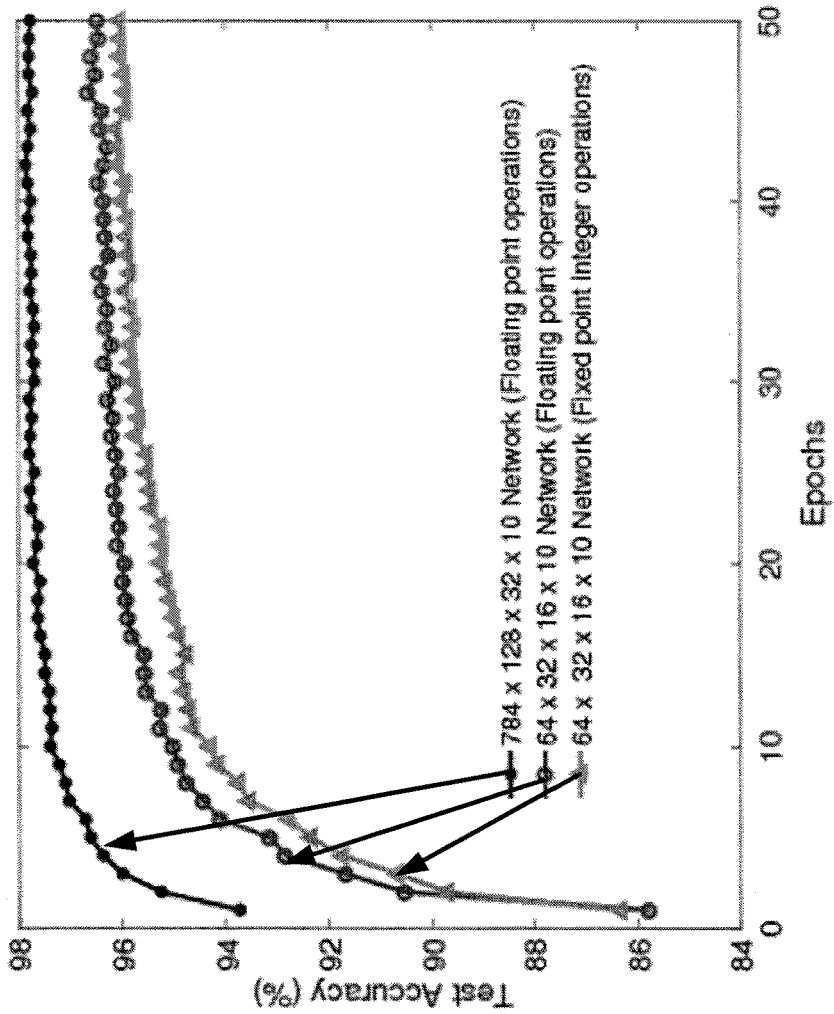
FIG. 4 is a graph illustrating classification accuracy of proposed neural networks on the MNIST (modified national institute of standards and technology) test dataset.
FIG. 5 is a table (Table 1) illustrating the time taken (in seconds) to process one neuron at a first layer of a neural network.

Both the networks (NN1 and NN2) described in the previous section are trained using mini-batch SGD with a batch size of 60 samples. When these networks are trained for 50 epochs using full floating point operations, they achieve an overall classification accuracy of 97.8% (for NN1) and 96.4% (for NN2). The evolution of test accuracy over multiple epochs is shown in FIG. 4. This shows that reasonable classification accuracy can be achieved on the MNIST dataset with a much fewer number of parameters.

Next, to estimate the classification accuracy of the proposed FHE-NIT solution, we quantize all the values into fixed-point signed integers. As described earlier, 8-bit representations are used for all the input and loss values, while 16-bit representations are used for the weights and gradients. It can be observed from FIG. 4 that the above quantized network (trained in the plaintext domain) can achieve a classification accuracy of 96%. Finally, we verify the gradient computations in the encrypted domain for a single mini-batch of data. Using the exact same weight initializations and sample set in both the plaintext and encrypted domains, we confirmed that the computations performed in both the domains are identical. Thus, it can be claimed that the classification accuracy of the model learned using homomorphically encrypted data will be the same as that of the quantized version of NN2, which is 96%.

3.3 Computational Complexity

Testing of encrypted domain processing was done on an Intel Xeon E5-2698 v3 (which is a Haswell processor), with two sockets and sixteen cores per socket, running at 2.30 GHz. The machine has 250 GB of main memory, the compiler was GCC version 7.2.1, and we used NTL version 10.5.0 and GnuMP version 6.0.

We primarily worked with the cyclotomic ring $\mathbb{Z}[X]/\Phi_m(X)$ with $m = 2^{10} - 1 = 1023$ (so $\phi(m) = 600$) for most of the development tasks. Since these parameters do not provide sufficient security, we also attempted to compare the time complexity when $m = 2^{15}1 = 32767$ (so $\phi(m) = 27000$), which corresponds to about 80 bits of security.

3.3.1 Single-Threaded Timing

For m=1023, a single thread execution of one mini-batch of size 60 training samples, required approximately 9 hours and 24 minutes. Almost 80% of this time is consumed by the three matrix multiplication tasks, namely, computation of the weight average input to a layer (requires multiplication of the input to a layer with its corresponding weight matrix), loss propagation to the previous layer (requires multiplication of the loss at the previous layer with the weight matrix), and the gradient computation. One complete mini-batch requires 6 bootstrapping operations (one after each layer during both the forward pass and backpropagation).

It was also observed that when m=32767, almost all the operations slowed down by approximately 40-60 times on a single threaded machine. However, it must be noted that m=32767 can accommodate 1,800 slots as compared to 60 slots for m=1023. Thus, it is possible to compensate for the increased computational complexity by packing more input samples into a single ciphertext and reducing the number of batches to be processed.

3.3.2. Multi-Threaded Timing

Multi-threading was very effective in reducing the computation time because it is well-known that the weight updates in SGD are independent. In other words, it is possible to process each neuron independently and in parallel. Even within a single neuron, the multiplication operations across multiple input dimensions can be parallelized. From Table 1, illustrated in FIG. 5, it can be observed that by parallelizing computations within a single neuron across multiple threads, it is possible to achieve almost linear speedup. Specifically, with 30 threads we observed about a 15× speed-up, which means that the execution of one mini-batch would take well under an hour for m=1023.

4. REFERENCES

[1] R. Agrawal and R. Srikant. Privacy-preserving data mining. In W. Chen, J. F. Naughton, and P. A. Bernstein, editors, Proceedings of the 2000 ACM SIGMOD International Conference on Management of Data, May 16-18, 2000, Dallas, Tex., USA, pages 439-450. ACM, 2000.

[2] M. Barni, C. Orlandi, and A. Piva. A privacy-preserving protocol for neural-network-based computation. In Proceedings of the 8th Workshop on Multimedia and Security, MM&Sec '06, pages 146-151, New York, N.Y., USA, 2006. ACM.

[3] D. Boneh, C. Gentry, S. Halevi, F. Wang, and D. J. Wu. Private database queries using somewhat homomorphic encryption. In ACNS, volume 7954 of Lecture Notes in Computer Science, pages 102-118. Springer, 2013.

[4] Z. Brakerski. Fully homomorphic encryption without modulus switching from classical gapsvp. In R. Safavi-Naini and R. Canetti, editors, CRYPTO, volume 7417 of Lecture Notes in Computer Science, pages 868-886. Springer, 2012.

[5] Z. Brakerski, C. Gentry, and V. Vaikuntanathan. (leveled) fully homomorphic encryption without bootstrapping. ACM Transactions on Computation Theory, 6(3):13, 2014.

[6] A. Costache, N. P. Smart, S. Vivek, and A. Waller. Fixed-point arithmetic in SHE schemes. In SAC, volume 10532 of Lecture Notes in Computer Science, pages 401-422. Springer, 2016.

[7] J. L. H. Crawford, C. Gentry, S. Halevi, D. Platt, and V. Shoup. Doing real work with FHE: the case of logistic regression. IACR Cryptology ePrint Archive, 2018:202, 2018.

[8] C. Gentry. Fully homomorphic encryption using ideal lattices. In Proceedings of the 41st ACM Symposium on Theory of Computing—STOC 2009, pages 169-178. ACM, 2009.

[9] C. Gentry, S. Halevi, C. S. Jutla, and M. Raykova. Private database access with he-over-oram architecture. In ACNS, volume 9092 of Lecture Notes in Computer Science, pages 172-191. Springer, 2015.

[10] C. Gentry, A. Sahai, and B. Waters. Homomorphic encryption from learning with errors: Conceptually simpler, asymptotically-faster, attribute-based. In R. Canetti and J. A. Garay, editors, Advances in Cryptology—CRYPTO 2013, Part I, pages 75-92. Springer, 2013.

[11] R. Gilad-Bachrach, N. Dowlin, K. Laine, K. E. Lauter, M. Naehrig, and J. Wernsing. Cryptonets: Applying neural networks to encrypted data with high throughput and accuracy. In ICML, volume 48 of JMLR Workshop and Conference Proceedings, pages 201-210. JMLR.org, 2016.

[12] Z. G. T. Gu and S. Garg. Safetynets: Verifiable execution of deep neural networks on an untrusted cloud.

[13] S. Halevi and V. Shoup. HElib—An Implementation of homomorphic encryption. See hyptertext transfer protocol secure at //github.com/shaih/HElib/.

[14] A. Khedr, P. G. Gulak, and V. Vaikuntanathan. SHIELD: scalable homomorphic implementation of encrypted data-classifiers. IEEE Trans. Computers, 65(9):2848-2858, 2016.

[15] A. Kim, Y. Song, M. Kim, K. Lee, and J. H. Cheon. Logistic regression model training based on the approximate homomorphic encryption. Cryptology ePrint Archive, Report 2018/254, 2018. In Advances in Neural Information Processing Systems, NIPS '17, 2017.

[16] M. Kim, Y. Song, S. Wang, Y. Xia, and X. Jiang. Secure logistic regression based on homomorphic encryption: Design and evaluation. JMIR Med Inform, 6(2):e19, April 2018.

[17] Y. LeCun, L. Bottou, Y. Bengio, and P. Haffner. Gradient-based learning applied to document recognition. Proceedings of the IEEE, 86(11):2278-2324, 1998.

[18] Y. Lindell and B. Pinkas. Privacy preserving data mining. J. Cryptology, 15(3):177-206, 2002.

[19] J. Liu, M. Juuti, Y. Lu, and N. Asokan. Oblivious neural network predictions via minionn transformations. In B. M. Thuraisingham, D. Evans, T. Malkin, and D. Xu, editors, Proceedings of the 2017 ACM SIGSAC Conference on Computer and Communications Security, CCS 2017, Dallas, Tex., USA, Oct. 30-Nov. 3, 2017, pages 619-631. ACM, 2017.

[20] P. Mohassel and Y. Zhang. Secureml: A system for scalable privacy-preserving machine learning. In 2017 IEEE Symposium on Security and Privacy, SP 2017, San Jose, Calif., USA, May 22-26, 2017, pages 19-38. IEEE Computer Society, 2017.

[21] V. Nikolaenko, U. Weinsberg, S. Ioannidis, M. Joye, D. Boneh, and N. Taft. Privacy-preserving ridge regression on hundreds of millions of records. In Security and Privacy (SP), 2013 IEEE Symposium on, pages 334-348. IEEE, 2013.

[22] C. Orlandi, A. Piva, and M. Barni. Oblivious neural network computing via homomorphic encryption. EURASIP J. Information Security, 2007, 2007.

[23] M. S. Riazi, C. Weinert, O. Tkachenko, E. M. Songhori, T. Schneider, and F. Koushanfar. Chameleon: A hybrid secure computation framework for machine learning applications. In 13 ACM Asia Conference on Information, Computer and Communications Security (ASIACCS'18). ACM, Jun. 4-8, 2018.

[24] C. J. V. Vaikuntanathan and A. Chandrakasan. GAZELLE: a low latency framework for secure neural network inference. In arXiv preprint, 2018.

[25] S. Wang, Y. Zhang, W. Dai, K. Lauter, M. Kim, Y. Tang, H. Xiong, and X. Jiang. Healer: homomorphic computation of exact logistic regression for secure rare disease variants analysis in gwas. Bioinformatics, 32(2):211-218, 2016.

[26] M. Zinkevich, M. Weimer, L. Li, and A. J. Smola. Parallelized stochastic gradient descent. 2010.

5. TECHNIQUES FOR ENCRYPTED DATA MODEL VERIFICATION

Now that the FHE-NIT system has been described, information corresponding to the current exemplary embodiments is described.

5.1 Introduction and Overview

This section provides an introduction and overview of the exemplary embodiments herein.

Figure 6B:
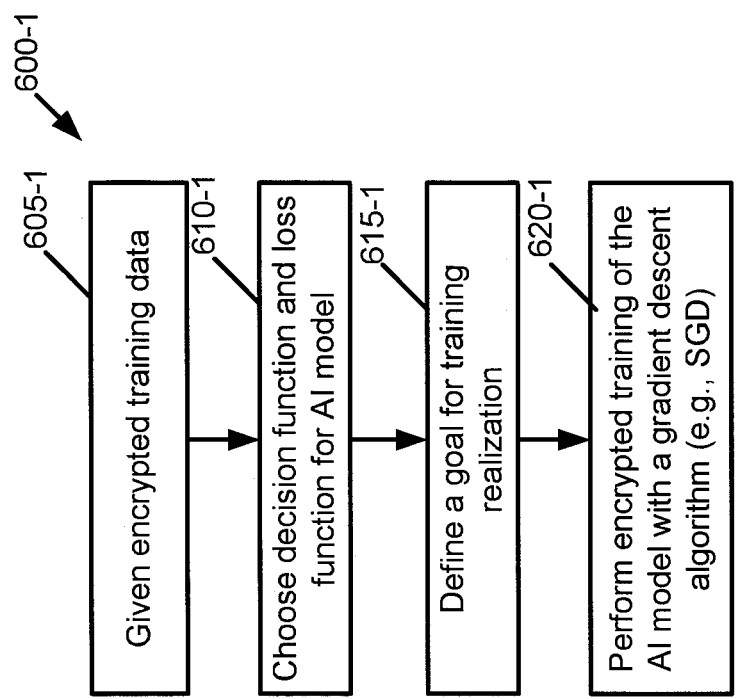
FIG. 6B is a flowchart of a general method for encrypted machine/deep learning.
Figure 6A:
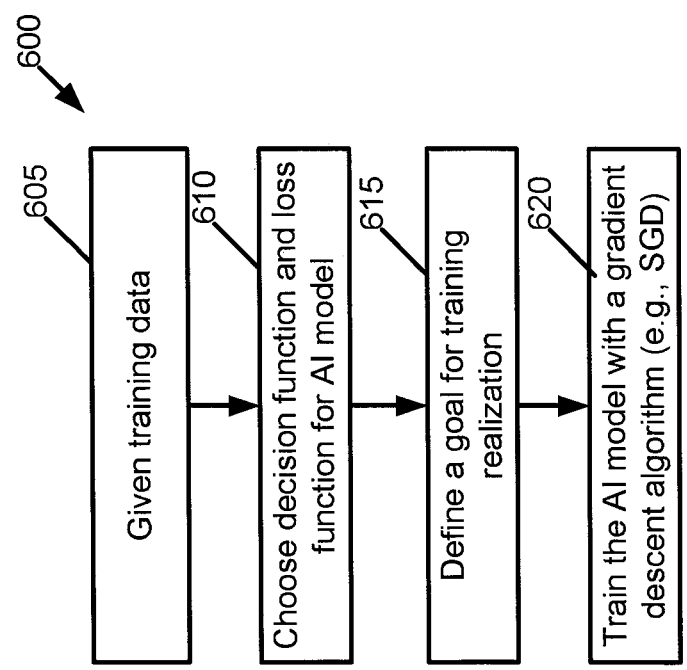
FIG. 6A is a flowchart of a general method for machine/deep learning.

As an introduction, FIG. 6A is a flowchart of a general method 600 for machine/deep learning. In block 605, training data is given, e.g., provided to or accessed by a system performing method 600. Mathematically, this may be illustrated as the following: $\{x_i, y_i\}_{i=1}^{N}$. In block 610, each of a decision function and a loss function are chosen. The decision function may be illustrated as follows: $\hat{y}=f_\theta(x_i)$. The loss function may be illustrated as follows: $l(\hat{y}, y_i) \in \mathbb{R}$.

In block 615, a goal is defined for training realization. This goal may be illustrated as follows:

$$\theta^* = \underset{\theta}{\operatorname{argmin}} \sum_{i=1}^{N} \ell(f_\theta(x_i), y_i).$$

In block 620, the AI model is trained with a gradient descent algorithm such as SGD, which takes small steps opposite the gradient: $\theta^{(t+1)}=\theta^{(t)}-\eta_t\Sigma_{i\in B}\nabla l(f_\theta^{(t)}(x_i), y_i)$. Once the goal is reached, based on the decision and loss functions, during training in block 620, the AI model is trained.

The training that is performed may involve a number of different techniques. For example, an optimization function used in training could be deterministic or stochastic. Each update of the model can be performed based on a gradient computed from single training sample, some subset of training samples, or an entire training sample set. The training regime could use a single training sample multiple times. In certain above examples, we used Mini-Batch Stochastic Gradient Descent (MB-SGD), where the AI model is updated based on smaller groups of training samples, such that the gradient is computed using k training samples, 1<k<K (a mini-batch size might be k=50 of the K total training samples). Different techniques have different benefits and detriments. In the text above with respect to the FHE-NIT system, MB-SGD was used.

Referring to FIG. 6B, this figure is a flowchart of a general method 600-1 for encrypted machine/deep learning. In this example, encrypted data is used and the functions, goals, and training are implemented using encrypted data and homomorphic encryption operations. The techniques previously described in section 2 above may be used. In block 605-1, training data is given, e.g., provided to or accessed by a system performing method 600. Mathematically, this may be illustrated as the following: $\{\varepsilon(x_i), \varepsilon(y_i)\}_{i=1}^N$, where $\varepsilon(\bullet)$ indicates the material in the parenthetical is encrypted. In block 610-1, each of a decision function and a loss function are chosen. The decision function may be illustrated as follows: $\varepsilon(\hat{y}) = f_{\varepsilon(\theta)}(\varepsilon(x_i))$. The loss function may be illustrated as follows: $l_\varepsilon(\varepsilon(\hat{y}), \varepsilon(y_i)) \in \mathbb{R}$.

In block 615-1, a goal is defined for training realization. This goal may be illustrated as follows:

$$\theta^* = \underset{\varepsilon(\theta)}{\operatorname{argmin}} \sum_{i=1}^N \ell_\varepsilon(f_{\varepsilon(\theta)}(\varepsilon(x_i)), \varepsilon(y_i)).$$

In block 620-1, the AI model is trained with a gradient descent algorithm such as SGD, using the homomorphic encryption techniques described above. The may be represented as the following: $\varepsilon(\theta^{(t+1)}) = \varepsilon(\theta^{(t)}) - \eta_t \Sigma_{i \in B} \nabla l(f_{\varepsilon(\theta^{(t)})}(\varepsilon(x_i)), \varepsilon(y_i))$. Once the goal is reached, based on the decision and loss functions, during training in block 620-1, the AI model is assumed to be trained.

FIG. 6B provided an introduction to a general method for encrypted machine/deep leaning, but there are still possible issues with use of this and similar methods. As described above, for instance, it is unclear how the stakeholders can verify provenance of the models and/or the training that has been performed. Consider the following scenario. The user has data (e.g., health records) that cannot be shared on the cloud in their raw form. Instead, the user encrypts the data and shares the encrypted data. The deep learning service provider can learn an "encrypted model" (that is, an AI model that uses encrypted data and has encrypted model parameters) based on the encrypted data, and shares the "encrypted model" with the user, while promising good accuracy performance. The user may either decrypt the model and use the decrypted model for prediction on new data, or obtain an encrypted prediction (from another entity having the model) and decrypt the prediction to obtain the predicted label. Questions that concern this process are as follows:

How do we make sure that the user data was indeed used for training?

Did the service provider just provide an old network (e.g., instead of an up-to-date one)?

The exemplary embodiments here help to provide answers to one or both of these questions. For example, one idea used herein is that the end-user can send the homomorphically encrypted training data (as in block 605-1 of FIG. 6B) to a learning service provider (LSP). The LSP may add an additional layer of obfuscation to the encrypted data, resulting in "doubly encrypted" data. This additional obfuscation could be one or more of the following: (1) re-encryption with a new key; (2) key switching; or (3) additive blinding. The LSP may publish the intermediate results of the training process on, e.g., a blockchain. These intermediate results may include one or more of the following:

(1) samples selected for a mini-batch;

(2) "doubly encrypted" input to a computational step (e.g., input to a layer in the neural network); or (3) "doubly encrypted" output of a computational step (e.g., output of a layer in the neural network).

The end-user could verify the integrity of the training process by (e.g., statistically) sampling data points from the blockchain of training progression at any level of granularity, requesting the LSP to remove the added obfuscation for the selected computations, decrypting the un-obfuscated data, and verifying if the unencrypted inputs and outputs of a computational step are consistent with the defined computation.

5.2 Exemplary System

Figure 7:
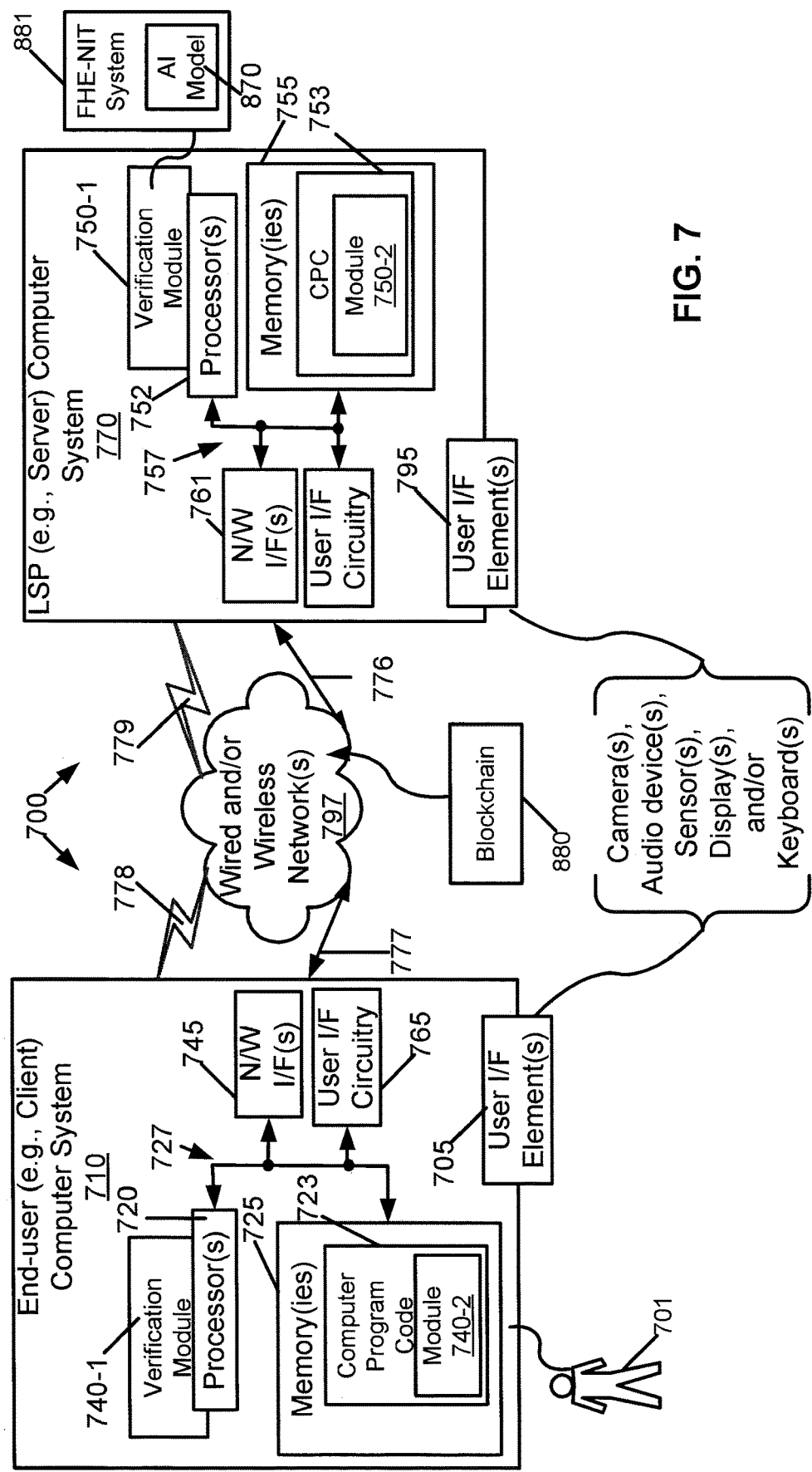
FIG. 7 is a block diagram of an exemplary and non-limiting system in which the exemplary embodiments may be implemented, in accordance with an exemplary embodiment.

Turning to FIG. 7, this figure shows a block diagram of one possible and non-limiting exemplary system 700 in which the exemplary embodiments may be practiced. In FIG. 7, an end-user (e.g., client) computer system 710 is in wired and/or wireless communication with a learning service provider (LSP) (e.g., server) computer system 770 via the wired or wireless networks 797 (e.g., such as the Internet, local or wide area networks, and the like). It is assumed the end-user computer system 710 is a client that accesses the LSP computer system 770, e.g., as a server, and therefore the end-user computer system 710 will also be referred to as a client and the LSP computer system 770 will also be referred to herein as a server. However, there does not need to be a client/server relationship between the end-user computer system 710 and the LSP computer system 770.

The end-user computer system 710 includes one or more processors 720, one or more memories 725, one or more network (N/W) interfaces (I/F(s)) 745, and user interface circuitry 765, interconnected through one or more buses 727. The one or more buses 727 may be address, data, and/or control buses, and may include any interconnection mechanism, such as a series of lines on a motherboard or integrated circuit, fiber optics or other optical communication equipment, and the like. The one or more memories 725 include computer program code 723.

The end-user computer system 710 includes a verification module 740, comprising one of or both parts 740-1 and/or 740-2, which may be implemented in a number of ways. The verification module 740 may be implemented in hardware as verification module 740-1, such as being implemented as part of the one or more processors 720. The verification module 740-1 may be implemented also as an integrated circuit or through other hardware such as a programmable gate array. In another example, the verification module 740 may be implemented as verification module 740-2, which is implemented as computer program code 723 and is executed by the one or more processors 720. For instance, the one or more memories 725 and the computer program code 723 may be configured to, with the one or more processors 720, cause the end-user computer system 710 to perform one or more of the operations as described herein. It should also be noted that the devices shown in the end-user computer system 710 are not limiting and other, different, or fewer devices may be used.

The user interface circuitry 765 may communicate with one or more user interface elements 705, which may be formed integral with the end-user computer system 710 or be outside the end-user computer system 710 but coupled to the end-user computer system 710. The user interface elements 705 may include one or more of the following: one or more camera(s); one or more audio device(s) (such as microphone(s), speaker(s), and the like); one or more sensor(s) (such as GPS sensor(s), fingerprint sensor(s), orientation sensor(s), and the like); one or more displays; and/or one or more keyboards. This list is not exhaustive or limiting, and other, different, or fewer elements may be used. A user 701 (a human being in this example) interacts with the end-user computer system 710, e.g., to cause the system 710 to take certain actions such as causing the system to verify an AI model 870. These operations may also be caused by the end-user computer system 710 itself, in combination with actions by the user 701 or without actions by the user 701. The end-user computer system 710 communicates with LSP computer system 770 via one or more wired or wireless networks 797, via wired links 777 and 778 and wireless links 778 and 779. The network (N/W) interfaces (I/F) 745 are wired and/or wireless circuitry providing this communication.

The LSP computer system 770 includes one or more processors 752, one or more memories 755, one or more network interfaces (N/W I/F(s)) 761, and user interface circuitry 775, interconnected through one or more buses 757. The one or more memories 755 include computer program code 753. The LSP computer system 770 includes a verification module 750. The verification module 750 includes an FHE-NIT system 881, as described above, which includes an AI model 870. The AI model 870 may be a neural network (NN) 100 such as a deep neural network (DNN), which is typically defined as a NN with multiple hidden layers (thus, NN 100 is also a DNN). The verification module 750 comprises one of or both parts 750-1 and/or 750-2, which may be implemented in a number of ways. For instance, the verification module 750 may be implemented in hardware as verification module 750-1, such as being implemented as part of the one or more processors 752. The verification module 750-1 may be implemented also as an integrated circuit or through other hardware such as a programmable gate array. In another example, the verification module 750 may be implemented as verification module 750-2, which is implemented as computer program code 753 and is executed by the one or more processors 752. For instance, the one or more memories 755 and the computer program code 753 are configured to, with the one or more processors 752, cause the LSP computer system 770 to perform one or more of the operations as described herein. It should also be noted that the devices shown in the LSP computer system 770 are not limiting and other, different, or fewer devices may be used.

The one or more buses 757 may be address, data, and/or control buses, and may include any interconnection mechanism, such as a series of lines on a motherboard or integrated circuit, fiber optics or other optical communication equipment, wireless channels, and the like. The user interface circuitry 775 communicates with one or more user interface elements 195, which may be formed integral with the LSP computer system 770 or be outside the server computer system 170 but coupled to the LSP computer system 770. The user interface elements may include one or more of the following: one or more camera(s); one or more audio device(s) (such as microphone(s), speaker(s), and the like); one or more sensor(s) (such as GPS sensor(s), fingerprint sensor(s), orientation sensor(s), and the like); one or more displays; and/or one or more keyboards. This list is not exhaustive or limiting, and other, different, or fewer elements may be used. For instance, the LSP computer system 770 could be remotely operated and there might not be any user interface element 795. The network (N/W) interfaces (I/F) 761 are wired and/or wireless circuitry providing this communication.

Now that one possible exemplary system has been described, additional details regarding the exemplary embodiments are described.

5.3 Additional Methods

Figure 8:
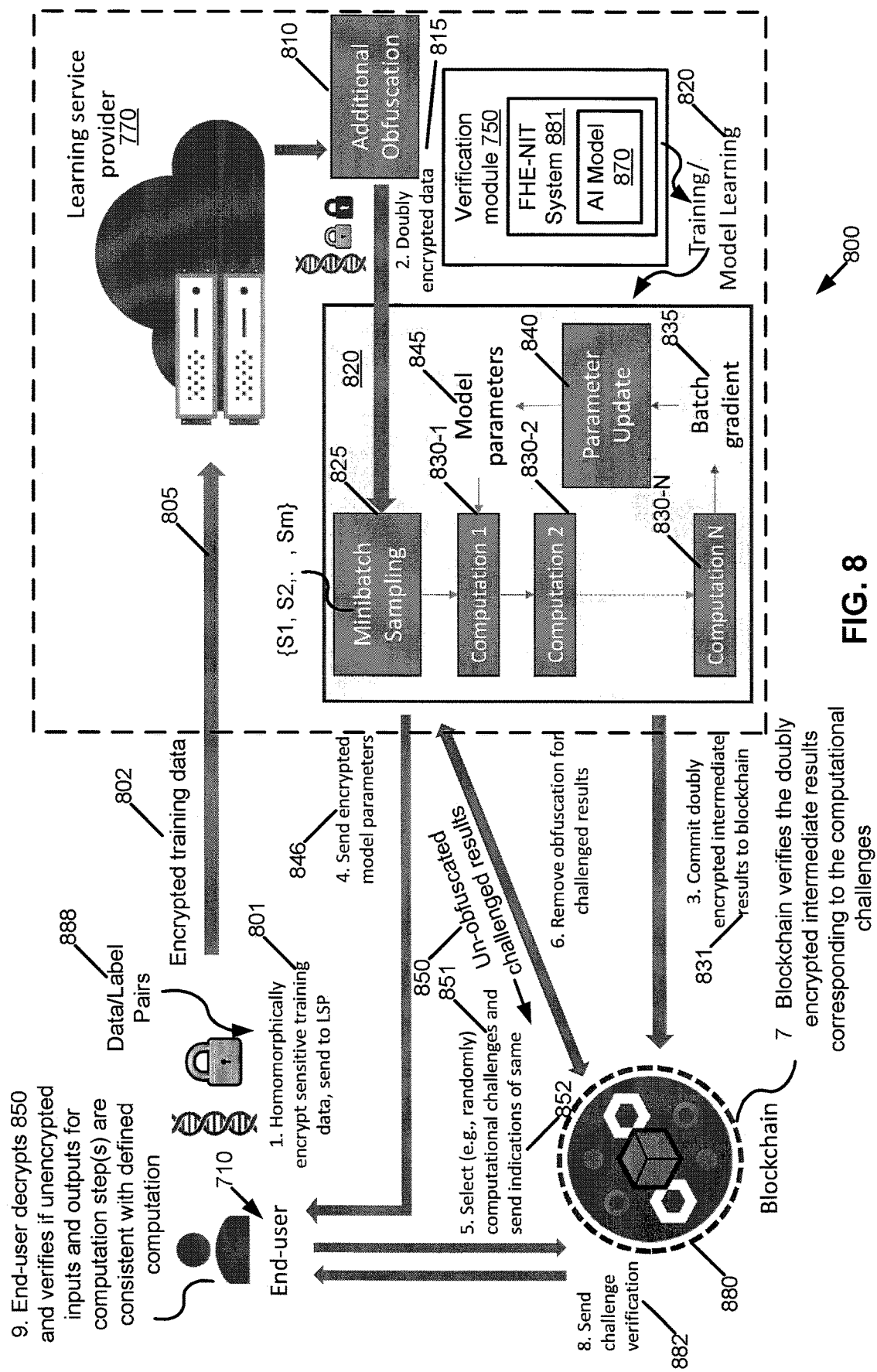
FIG. 8 is a flowchart of a method for encrypted data model verification using the entities in FIG. 7, in accordance with an exemplary embodiment.

Referring now to FIG. 8, this figure is a flowchart of a method 800 for encrypted data model verification using the entities in FIG. 7, in accordance with an exemplary embodiment. Multiple other methods are described below.

In step 1, the method 800 begins when the end-user computer system 710 homomorphically encrypts sensitive training data 801 and sends the encrypted training data 802 toward the LSP computer system 770. Note the icon for the DNA (deoxyribonucleic acid) illustrates the data 801 is sensitive and the lock icon indicates the data 801 has been encrypted as encrypted training data 802. The training data 801 may comprise data/label pairs 888. For instance, the data might be a digital image of a cat and the corresponding label would be "cat" to indicate the data is an image of a cat.

The LSP computer system 770 in reference 805 receives the encrypted training data 802 and in block 810 performs an additional obfuscation on the encrypted training data 802, resulting in the doubly encrypted data 815. Note that while the additional obfuscation is optional, service providers might find this to be desirable for use, e.g., to allow them to control access to their particular AI model 870. There are two lock icons in this figure, meaning this data 815 is doubly encrypted. This additional obfuscation in block 810 could be one or more of the following: (1) re-encryption with a new key; (2) key switching; or (3) additive blinding. This additional obfuscation is performed, for instance, to prevent the user 701 (or the user's end-user computer system 710) from exercising the model 870 without involving the service provider such as without paying fees to the service provider.

The LSP computer system 770 uses the doubly encrypted data 815 in the training/model learning process 820, which is performed in this example under control of the verification module 750. The verification module 750 also accesses the FHE-NIT system 881 (as described above mainly in sections 1-4) and an AI model 870 such as a neural network (NN) 100. In an exemplary embodiment, the training/model learning process 820 may be thought of as a process for training a NN 100 using the FHE-NIT techniques (by FHE-NIT system 881) described above and the blocks in process 820. The training determines insights for a sequence of computations 830 used in the AI model, where the computational details of each of the computations 830 are defined.

As part of process 820, in block 825, this example uses mini-batch (shown as "minibatch") sampling, where multiple but not all training data 801 are chosen (as the mini-batch) and used for training. Note that while FIG. 8 makes it appear that only one mini-batch is used, a typical training would use many mini-batches. The training samples for the illustrated mini-batch sampling in block 825 are formed into the set {S1, S2, . . . , Sm} in this example. These samples are passed through N computation steps: computation step 1 830-1, computation step 2 830-2, . . . , computation steps N 830-N. The output of these computation steps 830 is applied to a batch gradient 835, and the output of the batch gradient 835 is applied to the parameter update block 840. If there are m samples in the mini-batch, there would typically be one parameter update after calculations have been performed using the m samples. The parameter update block 840 updates the model parameters 845, such as the neuron weights, and the flow proceeds back to computation step 1 830-1. This flow typically ends when the goal is met given these samples (or if the goal is not met after some maximum limit of training iterations/epochs).

During process 820, the LSP computer system 770 will commit (see step 3) doubly encrypted intermediate results 831 to the blockchain 880. These intermediate results 831 may include all of the following:

(1) samples {S1, S2, ..., Sm} selected for the mini-batch in the mini-batching sampling 825;

(2) (doubly encrypted) input to a computation step 830 (e.g., input to a layer in the neural network); or (3) (doubly encrypted) output of a same computation step 830 (e.g., output of the layer in the neural network).

The blockchain is a distributed database with a number of properties. These properties include verification of each step in a chain of steps and also linking with a verifiable signature of integrity each step, such that each step in the chain is verified and links between this step and other steps have a verifiable signature of integrity. While blockchains are mainly described herein, there are many other distributed database architectures where the exemplary embodiments may be used, and the exemplary embodiments are not limited to blockchains.

At some point, all of the doubly encrypted intermediate results 831 that will be committed have been committed and the AI model 870 is considered to be trained (e.g., based on the goal from block 615-1 and the process in block 620-1 of FIG. 6B). It is noted that the more steps are recorded, the more certainly the user is assured that a given training was performed using all of the training data 802, but this also decreases the complexity of a reverse engineering effort for the user to understand the modelling procedure. In other words, the latter makes it less the LSP can keep the AI model 870 secret. The LSP computer system 770 sends (see step 4) encrypted model parameters 846 to the end-user computer system 710. The encrypted model parameters 846 typically are the encrypted model weights. The end-user computer system 710 in step 5 selects (e.g., randomly) one or more computational challenges 851 and sends indications 852 of the same to the blockchain. Each of these one or more computational challenges 851 corresponds to one of the doubly encrypted intermediate results 831.

In step 6, the LSP computer system 770 removes the obfuscation added in block 810 to the doubly encrypted intermediate results 831 that correspond to the one or more computational challenges 851. The un-obfuscated challenged results 850 are sent from the LSP computer system 770 and are routed to the end-user computer system 710.

The blockchain 880 in step 7 verifies the doubly encrypted intermediate results 831 corresponding to the computational challenges 851, using typical blockchain techniques. The blockchain 880 in step 8 sends challenge verification 882 toward the end-user computer system 710. The challenge verification 882 may include, e.g., a list of each of the one or more computational challenges 851 and an indication of whether each of the one or more computational challenges 851 was or was not verified.

In step 9, the end-user computer system 710 decrypts the un-obfuscated challenged results 850 and verifies if unencrypted inputs and outputs for corresponding computation step(s) are consistent with defined computation(s) for those step(s).

Figure 9:
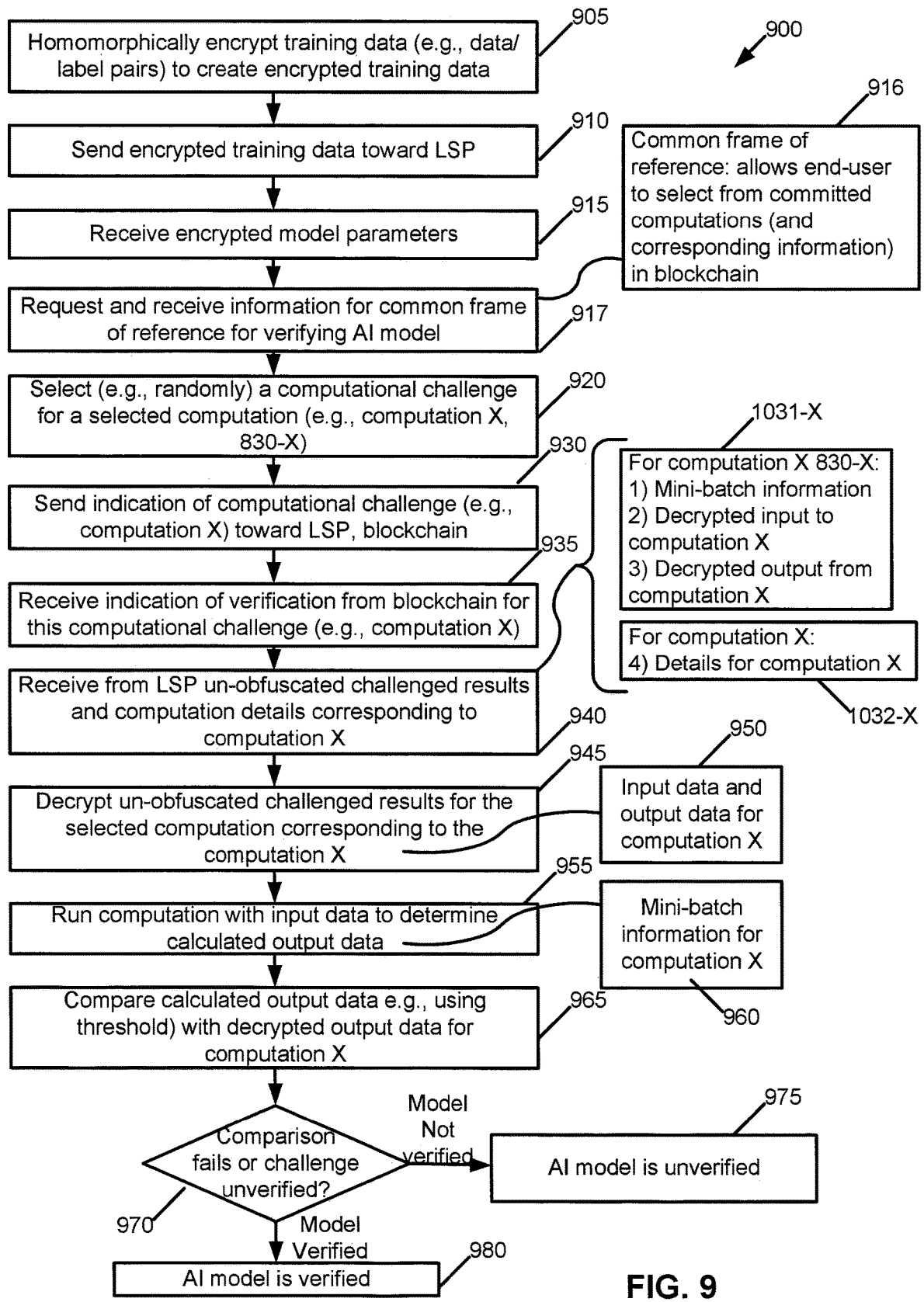
FIG. 9 is a flowchart of a method of encrypted data model verification performed by an end-user, in accordance with an exemplary embodiment.
Figure 10:
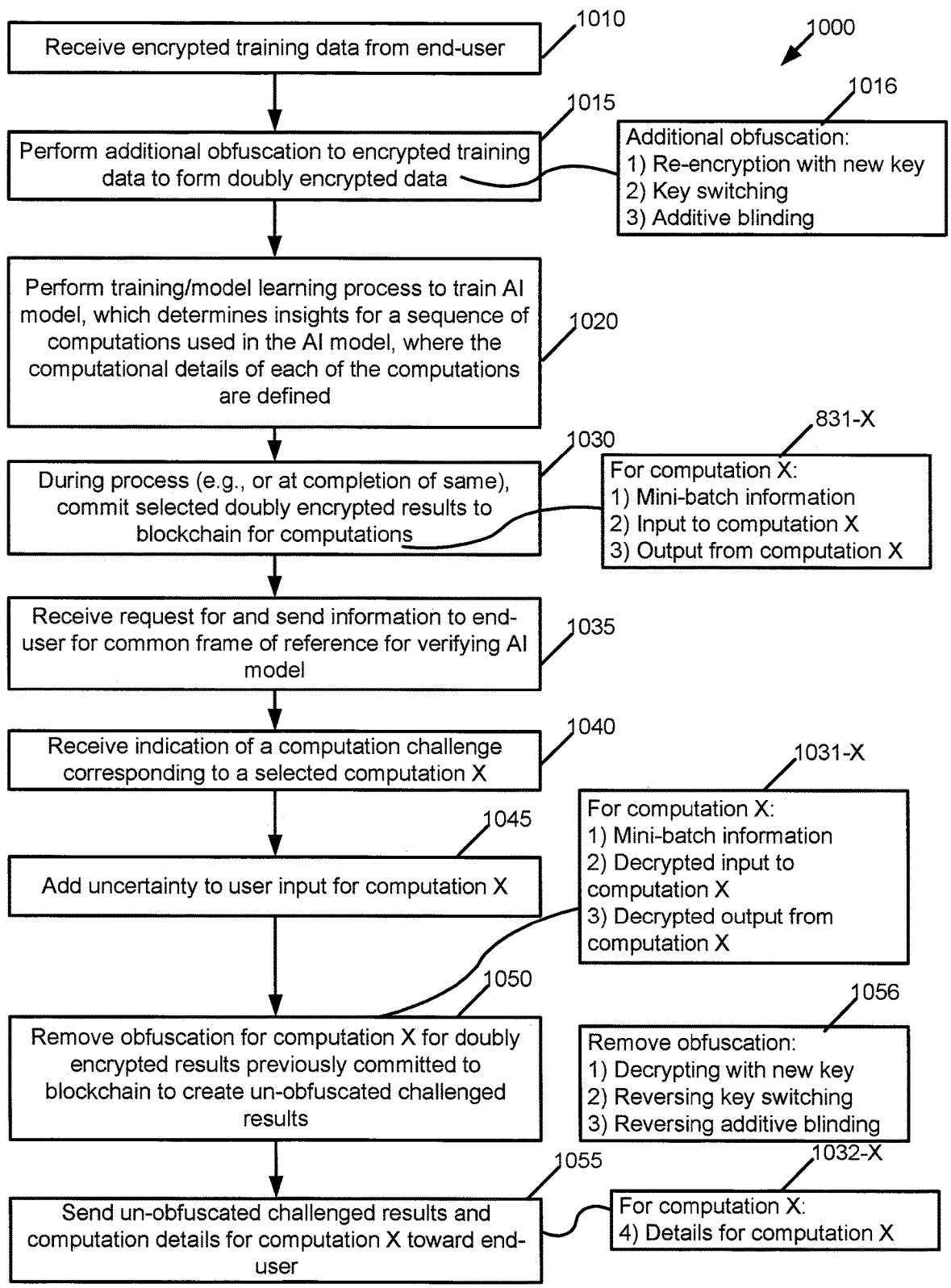
FIG. 10 is a flowchart of a method of encrypted data model verification performed by a learning service provider, in accordance with an exemplary embodiment.
Figure 11:
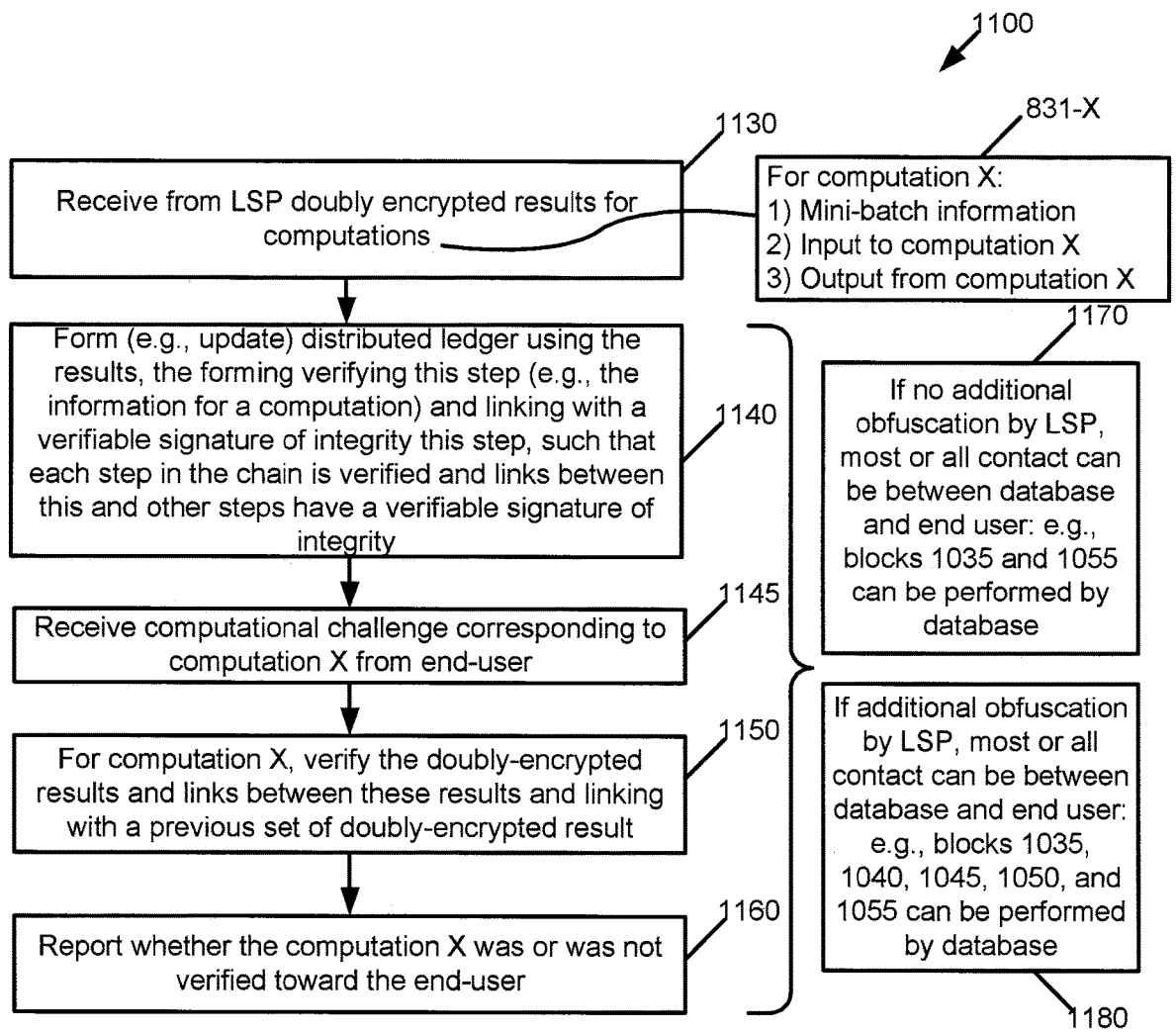
FIG. 11 is a flowchart of a method of encrypted data model verification performed by a blockchain, in accordance with an exemplary embodiment.

Due to space considerations, not all information regarding operations performed by the various entities in FIG. 8 could be put on FIG. 8. FIGS. 9, 10, and 11 provide additional information about these operations, and also operations already described relative to FIG. 8, for the end-user computer system 710, LSP computer system 770, and blockchain 880, respectively.

Turning to FIG. 9, this figure is a flowchart of a method 900 of encrypted data model verification performed by an end-user, in accordance with an exemplary embodiment. The operations performed in FIG. 9 are assumed to be performed by the end-user computer system 710, e.g., under control of the verification module 740 (and perhaps under control in part by the user 710).

In block 905 (see also step 1 of FIG. 8), the end-user computer system 710 homomorphically encrypts training data 801 (e.g., data/label pairs 888) to create encrypted training data 802. In block 910 (see also step 805 of FIG. 8), the end-user computer system 710 sends the encrypted training data 802 toward the LSP. In block 915 (see also step 4 in FIG. 4), the end-user computer system 710 receives from the LSP computer system 770 encrypted model parameters 846, e.g., which are typically the encrypted weights of the AI model 870. These encrypted model parameters 846 effectively define the AI model 870.

In block 917, the end-user computer system 710 requests (from the LSP computer system 770) and receives (from the LSP computer system 770) information for common frame of reference for verifying AI model 870. That is, the end-user computer system 710 and LSP computer system 770 have a common frame of reference, i.e., such that the end-user computer system 710 can specify which particular computation the user 701 can challenge. See block 916: The common frame of reference allows the end-user to select from committed computations (and corresponding information) in blockchain. That is, in block 917, the service provider and the end user can have a standardized reference to the computation sequence requiring, say, N computations needed sequentially referred to, e.g., with floating point numbers between 0 (zero) and 1 (one). In block 920 (see also step 5 in FIG. 8), the end-user computer system 710 selects (e.g., randomly) a computational challenge 851 for a selected computation. This selection uses the information for the common frame of reference from block 917. The example used in FIGS. 9, 10, and 11 is a single computation, "computation X". This is assumed to be a computation 830 for a specific mini-batch sample 825. Although multiple computations 830 may be selected, FIGS. 9, 10, and 11 concentrate for ease of reference on only a single computation X 830-X. It should also be noted that mini-batch sampling is used as an example, and other types of sampling may be used instead of this.

The end-user computer system 710 in block 930 (see also step 5 of FIG. 8) sends indication of computational challenge 851 (e.g., computation X) toward the LSP computer system 770 and the blockchain 880. This may pass through the blockchain 880 to the LSP computer system 770 or go from the end-user computer system 710 to the LSP computer system 770 without passing through the blockchain 880. In block 935, the end-user computer system 710 receives indication of verification from the blockchain for this computational challenge (e.g., computation X). That is, the blockchain 880 can determine whether the committed information for this computation X is verified or not, and send an indication of the same to the end-user computer system 710. See also step 8 in FIG. 8.

The end-user computer system 710 in block 940 receives from the LSP computer system 770 un-obfuscated challenged results and computation details corresponding to computation X. For computation X 830-X, this is assumed to be the following (see reference 1031-X):

1) Mini-batch information;
2) Decrypted input to computation X; and
3) Decrypted output from computation X.

Additionally, this includes (see reference 1032-X):

4) Details for computation X.

In block 945, the end-user computer system 710 decrypts un-obfuscated challenged results for the selected computation corresponding to the computation X. These include the decrypted input to computation X and the decrypted output from computation X, and reference 950 indicates there are input data and output data for computation X that are in the clear.

In block 955, the end-user computer system 710 runs the computation using a version of the AI model 870 as defined by the received model parameters (received in block 915) and the previously received computational details, and with the clear input data, to determine calculated and clear output data. Block 955 also uses the mini-batch information for computation X 830-X, see block 960. The end-user computer system 710 in block 965 compares calculated output data (from block 955) with decrypted and clear output data (from blocks 945/950) for computation X. Note that a threshold may be used for this calculation, such that if the comparison yields a difference less than the threshold (not equal to zero), the comparison would be valid and not be considered to fail. This allows, e.g., the LSP computer system 770 to add uncertainty to protect the details of the AL model 870, but also allow the end-user computer system 710 to perform the comparison.

In block 970, the end-user computer system 710 determines whether this comparison fails or does not fail and also whether the challenge X 830 X has been verified or not from the blockchain 880 (see block 935). If either this comparison fails or the challenge is unverified (block 970=Model not verified), the model is not verified and the end-user computer system 710 assumes the AI model 870 is unverified in block 975. One exemplary purpose of the verification is to ensure the service provider indeed used the end user's 802 data to develop the model. The unsuccessful verification cause some kind of exception processing by the user such as non-payment to the LSP 770, lodging a customer service complaint to the LSP 770, and the like. If both this comparison passes and the challenge is verified (block 970=Model verified), the model is verified, and the end-user computer system 710 in block 980 assumes the AI model is verified. Note that block 970 may be split into two operations, one with a comparison fail/pass and one with a challenge unverified/verified.

FIG. 10 is a flowchart of a method 1000 of encrypted data model verification performed by a learning service provider, in accordance with an exemplary embodiment. The operations performed in FIG. 10 are assumed to be performed by the LSP computer system 770, e.g., under control of the verification module 750.

The LSP computer system 770 in block 1010 receives encrypted training data from the end-user. See also step 805 in FIG. 8. The LSP computer system 770 performs additional obfuscation to encrypted training data 802 to form doubly encrypted data 815 in block 1015. See also block 810 in FIG. 8. The additional obfuscation might include the following (see block 1016):
  1) Re-encryption with new key;
  2) Key switching; and/or
  3) Additive blinding.

The LSP computer system 770 performs, in block 1020, a training/model learning process 820 to train the AI model 870. The performance of the training determines insights for a sequence (e.g., 830-1 through 830-N in FIG. 8) of computations 830 used in the AI model 870, where the computational details of each of the computations 830 are defined. In block 1030, the LSP computer system 770, during the process 820 (e.g., or at completion of same), commits selected doubly encrypted results 831 to the blockchain 880 for computations 830. See also step 3 in FIG. 8. The information committed may include information 831-X, for a computation 830-X:
  1) Mini-batch information;
  2) Input to computation X; and
  3) Output from computation X.

Note that the input to computation X and the output from computation X will be doubly encrypted, as will the mini-batch information. In an exemplary embodiment, in normal operation everything is doubly encrypted but can optionally be single encrypted (e.g., using only the end user's key). Choice of double or single encryption depends upon whether the service provider trusts the end user to use the model fairly (e.g., pay per use; do not reverse engineer) or not. Also, if mini-batches are not performed, then other corresponding information may be used instead of the mini-batch information. In block 1035, the LSP computer system 770 receives a request for and sends information to the end-user computer system 710 for a common frame of reference for verifying AI model. This common frame of reference allows the end-user computer system 710 to request one or more computations 830 (e.g., and corresponding mini-batch information) from the LSP computer system 770 for model verification of the AI model 870. In block 1040, the LSP computer system 770 receives from the end-user computer system 710 indication of a computation challenge corresponding to a selected computation X 830-X.

In block 1045, the LSP computer system 770 adds uncertainty to user input for computation X 830-X. That is, the service provider takes the user input, adds certain uncertainty to it (e.g., to prevent ending up providing the entire detail of the computations involved). The primary reason for adding uncertainty is to make sure the end-user does not exhaustively query all computations and therefore would be enabled to reverse engineer the service provider's technology. An alternative way to accomplish the same objective might be to put a ceiling on a number of or a fraction of computations the end-user can challenge.

The LSP computer system 770 in block 1050 removes the obfuscation for computation X for doubly encrypted results previously committed to blockchain to create un-obfuscated challenged results 850. The un-obfuscated challenged results 850 may include the following (see block 1031-X) for a computation X 830-X:
  1) Mini-batch information;
  2) Decrypted input to computation X; and
  3) Decrypted output from computation X.

As shown in block 1056, the removing the obfuscation may involve the following:
  1) Decrypting with new key;
  2) Reversing key switching; and/or
  3) Reversing additive blinding.

In block 1055, the LSP computer system 770 sends un-obfuscated challenged results 850 and computation details for computation X toward the end-user computer system 710. The computation details are details for computation X, see block 1032-X, which allow the end-user computer system 710 to actually perform the computation(s) in computation X using the input to the computation from 831-X.

Referring to FIG. 11, this figure is a flowchart of a method 1100 of encrypted data model verification performed by a blockchain, in accordance with an exemplary embodiment. In block 1130, the blockchain 880 receives from the LSP computer system 770 doubly encrypted results 831 for computations 830 (see also step 3 in FIG. 8). For a computation X 830-X, the doubly encrypted results 831 comprise the following:
1) Mini-batch information;
2) Input to computation X; and
3) Output from computation X.

The blockchain 880 in block 1140 forms (e.g., updates) a distributed ledger using the results 831. The forming verifies this step in a chain and the forming links with the step with a verifiable signature of integrity for this step. Each "step" in this case corresponds to the information committed for a particular (e.g., selected) computation 830. Thus, each step in the chain of steps will be verified and links between this step and other the steps (e.g., information for an immediately previously computation) will have a verifiable signature of integrity. In block 1145, the blockchain 880 receives a computational challenge corresponding to computation X 830-X from the end-user computer system 710. The blockchain 880 in block 1150 verifies (see also step 7 in FIG. 8), for computation X 830-X, the doubly-encrypted results 831 and links between these results with a previous set of doubly-encrypted results. That is, the doubly-encrypted results 831 (as information) form a step in a chain of steps, and the blockchain 880 verifies this step and the links from this step to other (eg, immediately preceding) steps using verifiable signatures of integrity. In block 1160, the blockchain 880 reports whether the computation X 830-X was or was not verified toward the end-user computer system 710. See also step 8 of FIG. 8, where the blockchain 880 sends a challenge verification 883 toward the end-user computer system 710. The challenge verification 883 indicates whether integrity of an individual ones of one or more chosen computations has been verified by the distributed database (the blockchain 880 in this example) and whether integrity of linking from the individual one of the one or more chosen computations to previous computations in the sequence of computations that have been committed to the distributed database.

In an exemplary embodiment, the LSP computer system 770 might not perform the additional obfuscation in block 810. This may be used, e.g., where the LSP trusts the end-user is not a competition to the LSP. This example is illustrated by block 1170, where if no additional obfuscation is used by the LSP computer system 770, most or all contact can be between the database 880 and end user 710. For instance, blocks 1035 and 1055 can be performed by the database 880. In this example, the database 880 does not perform any decryption of obfuscated information.

In another example, the information can come from blockchain unaided by LSP, e.g., if the blockchain, 880 has sufficient intelligence to not to give away all of the computations details when the end-user tries to exhaustively calculate with all steps. If blockchain can verify somehow the end-user's intention by keeping track of all her queries, the decrypting key might be embedded in blockchain API itself. In this example, the database 880 may perform decryption of obfuscated information. This example is illustrated by block 1180, where if additional obfuscation is performed by the LSP in block 810, most or all contact can be between the database 880 and the end user 710. That is, blocks 1035, 1040, 1045, 1050, and 1055 can be performed by the database 880. Other options are possible, such as block 1045 (adding uncertainty) not being performed by the database 880.

5.4 Additional Examples

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    training, by a computer system, an artificial intelligence model at least by determining insights for a sequence of computations used in the artificial intelligence model, the sequence being applied to one or more encrypted data and label pairs, wherein computational details of each of the computations are defined;
    receiving, at the computer system, indication from an end-user computer system of one or more of the selected computations; and
    sending computational details of the indicated one or more selected computations toward the end-user computer system for use by the end-user computer system for verifying the indicated one or more selected computations.

2. The method of claim 1, wherein:
    the method further comprises committing, by the computer system, information for selected ones of the sequence of computations into a distributed database, wherein the committed information comprises computational details used in processing performed for the selected computations;
    the distributed database has a property that the committed information for each selected computation is linked with a verifiable signature of integrity with a previously committed computation in the sequence of computations;
    the method further comprises performing, prior to the training, additional obfuscation on the one or more encrypted data and label pairs in order to create doubly encrypted data;
    the training the artificial intelligence model is performed using the doubly encrypted data, such that the committed information for the selected ones of the sequence of computations is doubly-encrypted;
    the method further comprises, prior to the sending, removing the additional obfuscation on the information previously committed to the distributed database for the indicated one or more selected computations to create un-obfuscated information; and
    the sending further comprises sending the un-obfuscated information to the end-user computer system for use by the end-user computer system for verification of the indicated one or more selected computations.

3. The method of claim 2, further comprising adding, prior to removing the additional obfuscation, uncertainty to at least some of the information previously committed to the distributed database for the indicated one or more selected computation.

4. The method of claim 1, wherein the committed information for a selected computation comprises:
    input to the computation; and
    output from the computation.

5. The method of claim 4, wherein the committed information for the selected computation further comprises mini-batch information used for the selected computation.

6. The method of claim 1, further comprising:
    committing, by the computer system, information for selected ones of the sequence of computations into a distributed database, wherein the committed information comprises computational details used in processing performed for the selected computations; and
    communicating with the end-user computer system to send information to the end-user computer system for a common frame of reference for verifying the artificial intelligence model, the common frame of reference providing information to allow the end-user computer system to choose from at least the committed information for the selected ones of the sequence of computations in the distributed database.

7. A computer system, comprising:
    memory having computer program code; and
    one or more processors, where the one or more processors, in response to retrieval and execution of the computer program code, cause the computer system to perform operations comprising:
training, by a computer system, an artificial intelligence model at least by determining insights for a sequence of computations used in the artificial intelligence model, the sequence being applied to one or more encrypted data and label pairs, wherein computational details of each of the computations are defined;
receiving, at the computer system, indication from an end-user computer system of one or more of the selected computations; and
sending computational details of the indicated one or more selected computations toward the end-user computer system for use by the end-user computer system for verifying the indicated one or more selected computations.

8. A method, comprising:
homomorphically encrypting, by a first computer system, one or more data and label pairs as training data;
sending by the first computer system the training data toward a second computer system, for use by the second computer system for training an artificial intelligence model having a sequence of computations;
choosing by the first computer system one or more computations from selected ones of the sequence of computations;
sending by the first computer system indication of the one or more chosen computations toward the second computer system;
receiving, by the first computer system and from the second computer system, computational details of the indicated one or more chosen computations; and
verifying by the first computer system the indicated one or more chosen computations using at least the computational details and the artificial intelligence model, wherein in response to the one or more chosen computations being verified, the corresponding artificial intelligence model is considered to be verified.

9. The method of claim 8, wherein choosing by the first computer system one or more computations from the sequence of computations for the artificial intelligence model further comprises randomly selecting the one or more computations from the sequence of computations for the artificial intelligence model.

10. The method of claim 8, wherein:
the method further comprises receiving, at the first computer system and from the second computer system, information corresponding to the indicated one or more selected computations; and
verifying the indicated one or more selected computations using at least the computational details further comprises verifying the indicated one or more selected computations by performing the corresponding computations using the computational details and the information corresponding to the indicated one or more selected computations.

11. The method of claim 10, wherein the information for a chosen computation comprises:
input to the computation; and
output from the computation.

12. The method of claim 11, wherein the information for the chosen computation further comprises mini-batch information used for the selected computation.

13. The method of claim 11, wherein the verifying the indicated one or more selected computations further comprises the first computer system decrypting both the input and the output, performing the corresponding computations using the input to determine a determined output, and comparing the determined output with the decrypted output, wherein the corresponding computations are verified in response to the determined output being deemed to meet the decrypted output.

14. The method of claim 8, further comprising communicating from the first computer system with the second computer system to receive information for a common frame of reference for verifying the artificial intelligence model, the common frame of reference providing information to allow the first computer system to choose from at least the selected ones of the sequence of computations committed to a distributed database.

15. The method of claim 8, wherein the method further comprises:
the first computer system sending the indication of the one or more chosen computations toward a distributed database, wherein the distributed database has a property that the committed information for each selected computation is linked with a verifiable signature of integrity with a previously committed computation in the sequence of computations;
the first computer system receiving indication of verification from the distributed database, the indication of verification indicating whether integrity of individual ones of the one or more chosen computations have been verified by the distributed database and whether integrity of linking from the individual ones of the one or more chosen computations to previous computations in the sequence of computations that have been committed to the distributed database; and
considering the corresponding artificial intelligence model to be verified in response to the received indication of verification indicating the one or more chosen computations are verified.

16. A computer program product comprising a computer readable storage medium having program instructions embodied therewith, wherein the program instructions are executable by a computer system to cause the computer system to perform operations comprising:
homomorphically encrypting, by a first computer system, one or more data and label pairs as training data;
sending by the first computer system the training data toward a second computer system, for use by the second computer system for training an artificial intelligence model having a sequence of computations;
choosing by the first computer system one or more computations from selected ones of the sequence of computations;
sending by the first computer system indication of the one or more chosen computations toward the second computer system;
receiving, by the first computer system and from the second computer system, computational details of the indicated one or more chosen computations; and
verifying by the first computer system the indicated one or more chosen computations using at least the computational details and the artificial intelligence model, wherein in response to the one or more chosen computations being verified, the corresponding artificial intelligence model is considered to be verified.

17. A method, comprising:
homomorphically encrypting, by a first computer system, one or more data and label pairs as training data;
sending by the first computer system the training data toward a second computer system, for use by the second computer system for training an artificial intelligence model having a sequence of computations and for committing information for selected ones of the sequence of computations into a distributed database;

choosing by the first computer system one or more computations from selected ones of the sequence of computations that have been committed to the distributed database;

sending by the first computer system indication of the one or more chosen computations toward a distributed database;

receiving, by the first computer system and from the distributed database, computational details of the indicated one or more chosen computations; and verifying by the first computer system the indicated one or more chosen computations using at least the computational details and the artificial intelligence model, wherein in response to the one or more chosen computations being verified, the corresponding artificial intelligence model is considered to be verified.

18. The method of claim 17, wherein choosing by the first computer system one or more computations from the sequence of computations for the artificial intelligence model further comprises randomly selecting the one or more computations from the sequence of computations for the artificial intelligence model.

19. The method of claim 17, wherein:
the method further comprises receiving, at the first computer system and from the distributed database, information corresponding to the indicated one or more selected computations; and
verifying the indicated one or more selected computations using at least the computational details further comprises verifying the indicated one or more selected computations by performing the corresponding computations using the computational details and the information corresponding to the indicated one or more selected computations.

20. The method of claim 19, wherein:
the information for a chosen computation comprises input to the computation and output from the computation; and
the verifying the indicated one or more selected computations further comprises the first computer system decrypting both the input and the output, performing the corresponding computations using the input to determine a determined output, and comparing the determined output with the decrypted output, wherein the corresponding computations are verified in response to the determined output being deemed to meet the decrypted output.

21. The method of claim 17, further comprising communicating from the first computer system with the distributed database to receive information for a common frame of reference for verifying the artificial intelligence model, the common frame of reference providing information to allow the first computer system to choose from at least the selected ones of the sequence of computations committed to the distributed database.

22. The method of claim 17, wherein the method further comprises:
the first computer system sending the indication of the one or more chosen computations toward the distributed database, wherein the distributed database has a property that the committed information for each selected computation is linked with a verifiable signature of integrity with a previously committed computation in the sequence of computations;
the first computer system receiving indication of verification from the distributed database, the indication of verification indicating whether integrity of individual ones of the one or more chosen computations have been verified by the distributed database and whether integrity of linking from the individual ones of the one or more chosen computations to previous computations in the sequence of computations that have been committed to the distributed database; and
considering the corresponding artificial intelligence model to be verified in response to the received indication of verification indicating the one or more chosen computations are verified.

* * * * *